US006958970B1

(12) United States Patent
Mizuno et al.

(10) Patent No.: US 6,958,970 B1
(45) Date of Patent: Oct. 25, 2005

(54) DISK PLAYER

(75) Inventors: Tomohiro Mizuno, Tokorozawa (JP);
Ken Okamura, Tokorozawa (JP);
Ryuji Tsukagoshi, Tokorozawa (JP);
Hidenori Takeda, Tokorozawa (JP);
Yusuke Akama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/656,953

(22) Filed: Sep. 7, 2000

(30) Foreign Application Priority Data

Sep. 10, 1999 (JP) .................................. 11-257711

(51) Int. Cl.[7] ............................................. G11B 17/08
(52) U.S. Cl. ............................................... 369/178.01
(58) Field of Search ..................... 369/178.01, 30.32, 369/30.34, 30.35, 30.36, 30.37, 30.72, 30.38

(56) References Cited

U.S. PATENT DOCUMENTS

| | | | |
|---|---|---|---|
| 4,410,921 A * | 10/1983 | Yamamura ............... | 360/99.06 |
| 4,453,188 A * | 6/1984 | Johnson et al. ........... | 360/78.04 |
| 4,949,328 A * | 8/1990 | Kase et al. ................ | 369/75.2 |
| 5,046,059 A * | 9/1991 | Yoshida et al. ........... | 369/30.89 |
| 5,528,567 A * | 6/1996 | Kim ......................... | 369/30.94 |
| 5,682,364 A * | 10/1997 | Ogawa ........................ | 369/36 |
| 5,777,957 A * | 7/1998 | Lyman ........................ | 369/37 |
| 6,091,676 A * | 7/2000 | Mochizuki ............... | 369/30.35 |
| 6,130,744 A * | 10/2000 | Abe et al. ..................... | 356/73 |
| 6,359,854 B1 * | 3/2002 | Nakanishi et al. ..... | 369/178.01 |
| 6,519,222 B2 * | 2/2003 | Hayashi et al. ........ | 369/178.01 |

FOREIGN PATENT DOCUMENTS

JP 07-282520 8/1996

* cited by examiner

*Primary Examiner*—Tianjie Chen
(74) *Attorney, Agent, or Firm*—Morgan Lewis & Bockius LLP

(57) ABSTRACT

A disk player which can insert and extract a disk, while a disk is being played, into and out of a compact body. During a movement in which one of disk trays is being moved from a disk standby position to a disk playing position, the disk comes into engagement with a disk playing means supporting mechanism to move the disk playing means in a predetermined direction.

3 Claims, 23 Drawing Sheets

DISK PLAYER

BACKGROUND OF THE INVENTION

1. Field of the Invention

The present invention relates to a disk player for accommodating a plurality of disks as information recording media in a disk player body, to play a desired disk.

2. Description of the Related Art

A disk reproducing/recording player (merely called the "disk player") is known. The word "reproduce" should be construed as "reproduce/record", so long as explicitly specified. The disk player can simultaneously accommodate a plurality of optical disks or magneto-optic disks (merely called the "disks") in a player casing so that they may be selectively played to reproduce the information recorded therein or so that desired information may be recorded in the disk. Of these disk players, it has been desired to provide a disk player which is provided with a disk loading mechanism for allowing one disk to be inserted and extracted into and out of the disk player body even while another disk is being reproduced.

There is known, in Japanese Patent Application No. 7-282520, a disk player which includes: a plurality of sub-trays for placing disks one by one; a main tray for transferring the sub-tray; and player means for reproducing the disks. In this disk player, the plurality of sub-trays and the main tray are held at disk standby positions in the player casing. By the operation of the operator, the sub-tray, as desired to be loaded or exchanged with a disk, is brought into engagement with the main tray. The main tray is held in engagement with a main tray moving means. When the switch of this main tray moving means is turned ON, the main tray is moved from the standby position to a disk exchanging position which is located outside of the casing of the disk player. Therefore, the disk is moved together with the sub-tray from the standby position to the disk exchanging position.

After the end of the load/exchange of the disk, the switch of the main tray moving means is turned ON again by the operation of the operator. The main tray returns together with the sub-tray placing the disk, from the disk exchange position outside of the casing to the standby position inside of the casing. When the sub-tray and the main tray are disengaged at the standby position, the load/exchange of the disk is completed.

When the disk at the standby position is to be reproduced, the sub-tray placing the disk desired to be reproduced is selected and is brought into engagement with sub-tray moving means by the operation of the operator. The sub-tray is moved from the standby position to the play position, which is located in a direction different from a disk exchange position, by sub-tray moving means (or the main tray moving means disengaged from the main tray). The play means for reproducing the information from the disk moves to the play position and reproduces the information signal while clamping the disk.

OBJECTS AND SUMMARY OF THE INVENTION

In the disk player of the prior art thus far described, the play means moves to the disk playing position which is selected by the operator. For this movement, it has been necessary to provide such transfer means and a drive member such as a motor or a gear block. Summing up the tray moving means, therefore, two or more moving means have to be provided, which creates a problem that the disk player is large-sized.

An object of the invention is to provide a disk player which can insert/extract a disk from its body even while another disk is being reproduced and which has a small-size player body.

According to the invention, there is provided a disk player for accommodating a plurality of disks at disk standby positions in a casing, so that a disk selected from the plurality of disks may be transferred to a disk playing position in the casing and may be reproduced. The disk player comprises: a plurality of disk trays stacked in a predetermined direction for placing the plurality of disks individually one by one; disk playing means for playing the disk at the disk playing position to reproduce the recorded information of the disk; and a disk playing means supporting mechanism for supporting the disk playing means movably in the predetermined direction. In a moving course where one of the disk trays is being moved from the disk standby position to the disk playing position, the one disk comes into engagement with the disk playing means supporting mechanism to move the disk playing means in the predetermined direction.

DESCRIPTION OF THE PREFERRED EMBODIMENT

Figure 1:
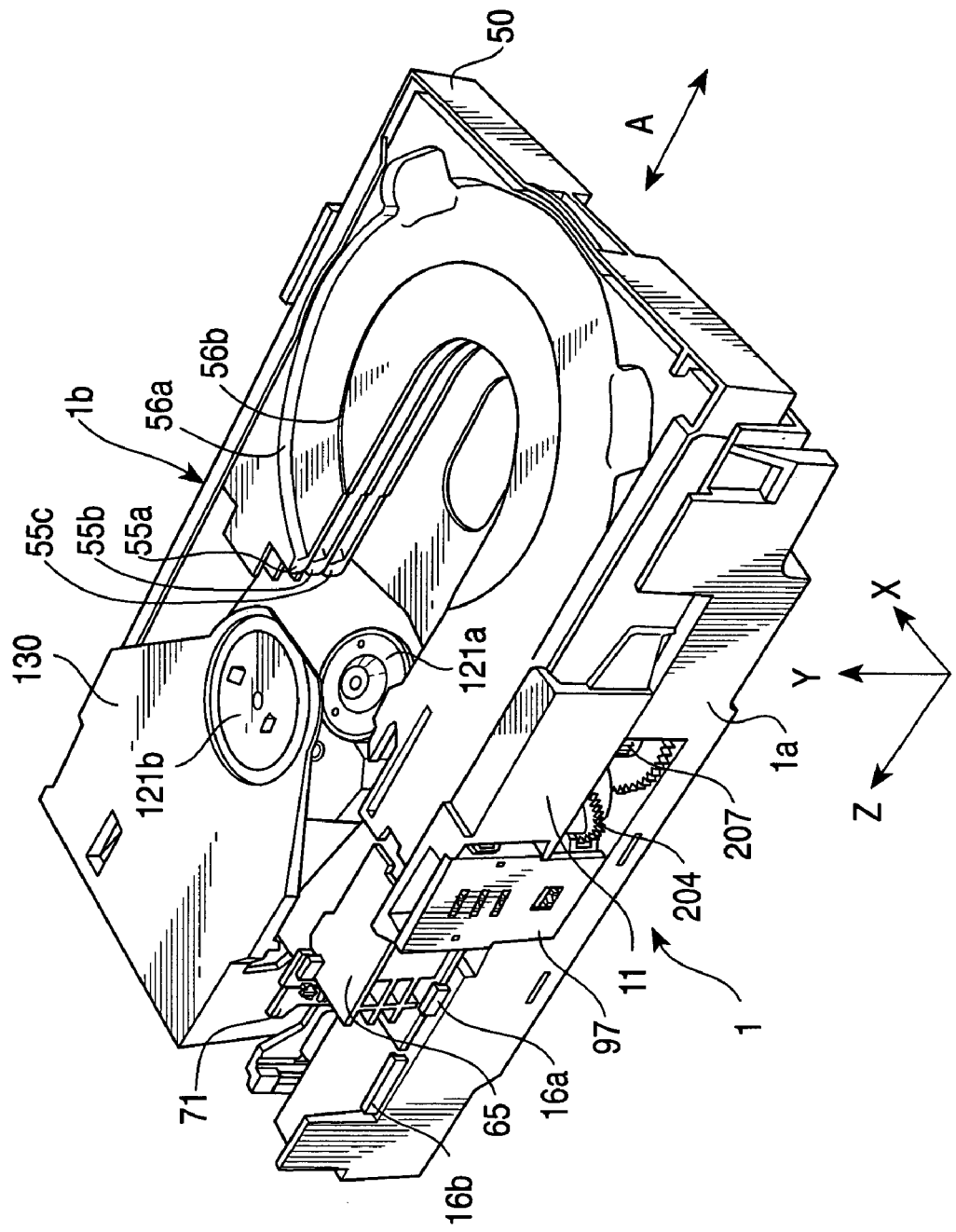
FIG. 1 is a perspective view of a disk player according to the invention.

A disk player according to an embodiment of the invention will be described with reference to the accompanying drawings.

In the (not-shown) casing of the disk player, as shown in FIGS. 1 to 9, there is fixed a resin chassis 1 which is generally "U" shaped in an X-Y section and which allows disks to be inserted and extracted in the directions of arrows A. Here, it will be assumed that: a rightward direction is indicated by arrow X; an upward direction by arrow Y; and a backward direction by arrow Z. In the space at a lower front half (the disk insertion side) in the Z-direction of the chassis 1, there are arranged motors and gear boxes for a tray moving mechanism 201 and a sub-tray selective drive mechanism 202, as will be described hereinafter. At the back, on the other hand, there is formed an accommodating room 2 for accommodating a later-described disk playing mechanism 203.

At the back end portion of the accommodating room 2, there is provided a beam 3 disposed in the X-direction for reinforcing the chassis 1.

Figure 3:
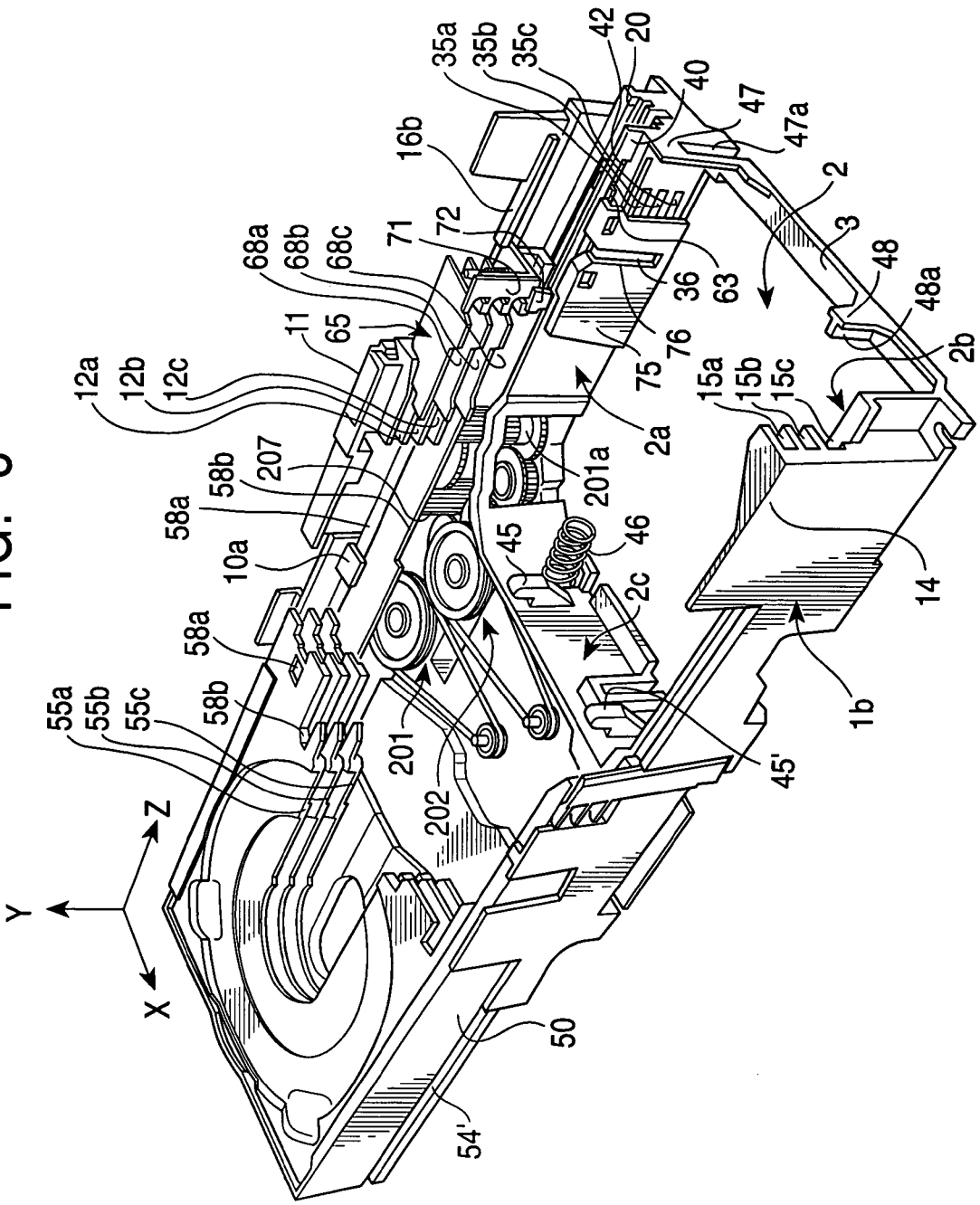
FIG. 3 is a perspective view of the disk player of FIG. 1 with its disk playing mechanism being removed and with its main tray being at a disk changing position.

On the inner wall face of a lefthand plate 1a of the chassis 1, as viewed on the lefthand side from the front of the disk player, there are formed a plurality of main tray guide projections 10a (although only one is shown in FIG. 3) which are projected in the X-direction, i.e., toward the center of the disk player. On the inner side face of a righthand plate 1b, on the other hand, there are formed a plurality of (not-shown) main tray guide projections 10b which are projected toward the center of the disk player and paired with the main tray guide projections 10a.

In the vicinity of the Z-direction center of the lefthand plate 1a, there is formed a first support plate 11 which supports a portion of the later-described sub-tray selective drive mechanism 202. The first support plate 11 is extended at its upper end portion in the X-direction, i.e., inward of the chassis. In the inner wall face of the first support plate 11, there are formed first to third sub-tray supporting grooves 12a, 12b and 12c which are opened toward the center of the chassis 1 and arranged in parallel with one another.

In the vicinity of the Z-direction back end potion of the righthand plate 1b, on the other hand, there is formed a tray supporting plate 14 which has first to third sub-tray supporting grooves 15a, 15b and 15c. These sub-tray supporting grooves 15a, 15b and 15c are opened inward of the chassis 1 from the righthand plate 1b and arranged in parallel with one another. These sub-tray supporting grooves 15a, 15b and 15c slidably support a plurality of later-described sub-trays in the A-directions together with the first to third sub-tray supporting grooves 12a, 12b and 12c.

In the vicinity of the back end portion of the lefthand plate 1a, fixed on the top face of the lefthand plate 1a are slide guides 16a and 16b having an X-Y section in the shape of an inverted "L", longitudinally spaced from each other (as shown in FIG. 1).

Figure 4:
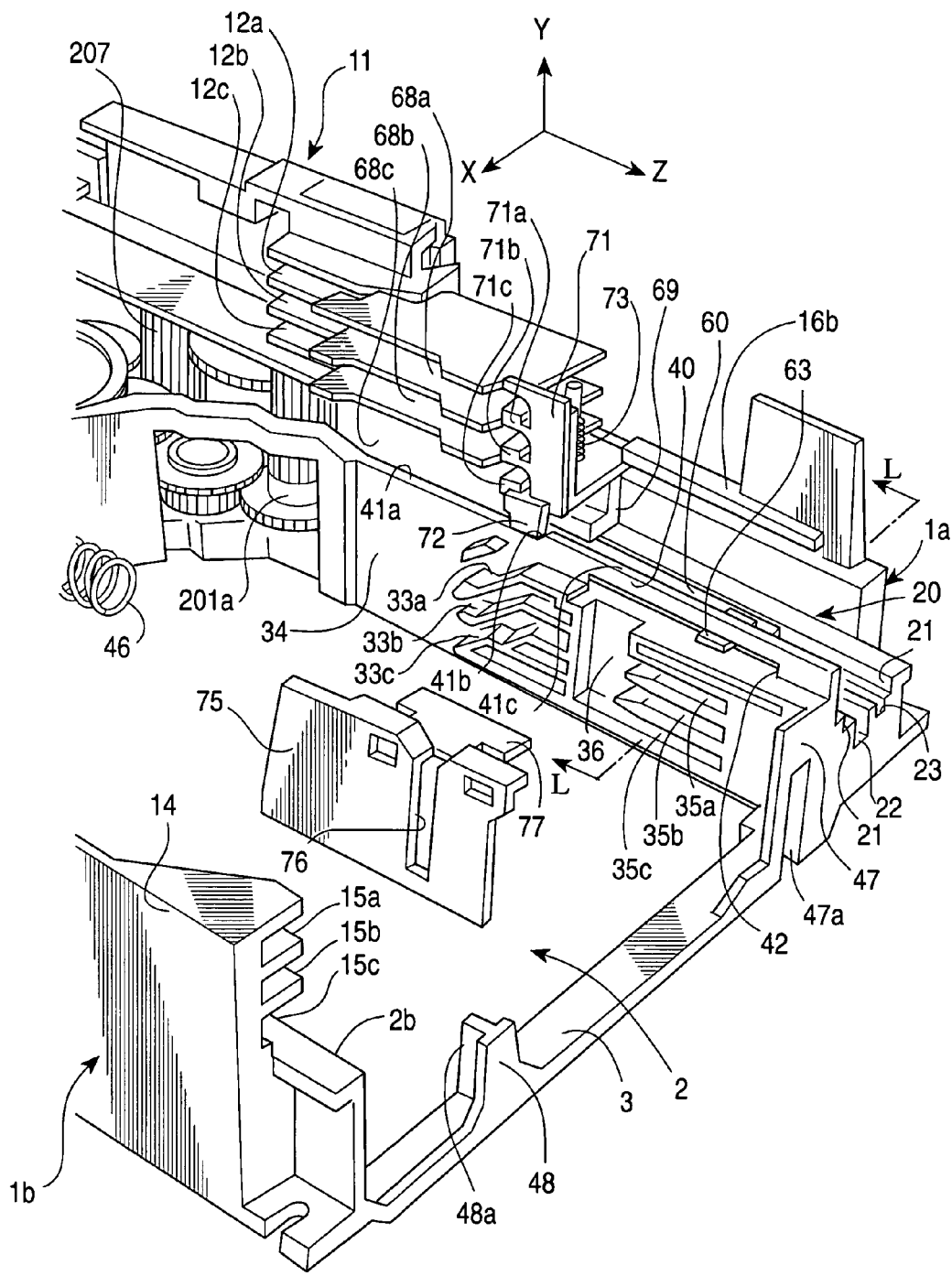
FIG. 4 is an exploded perspective view of a portion of FIG. 3.
Figure 5:
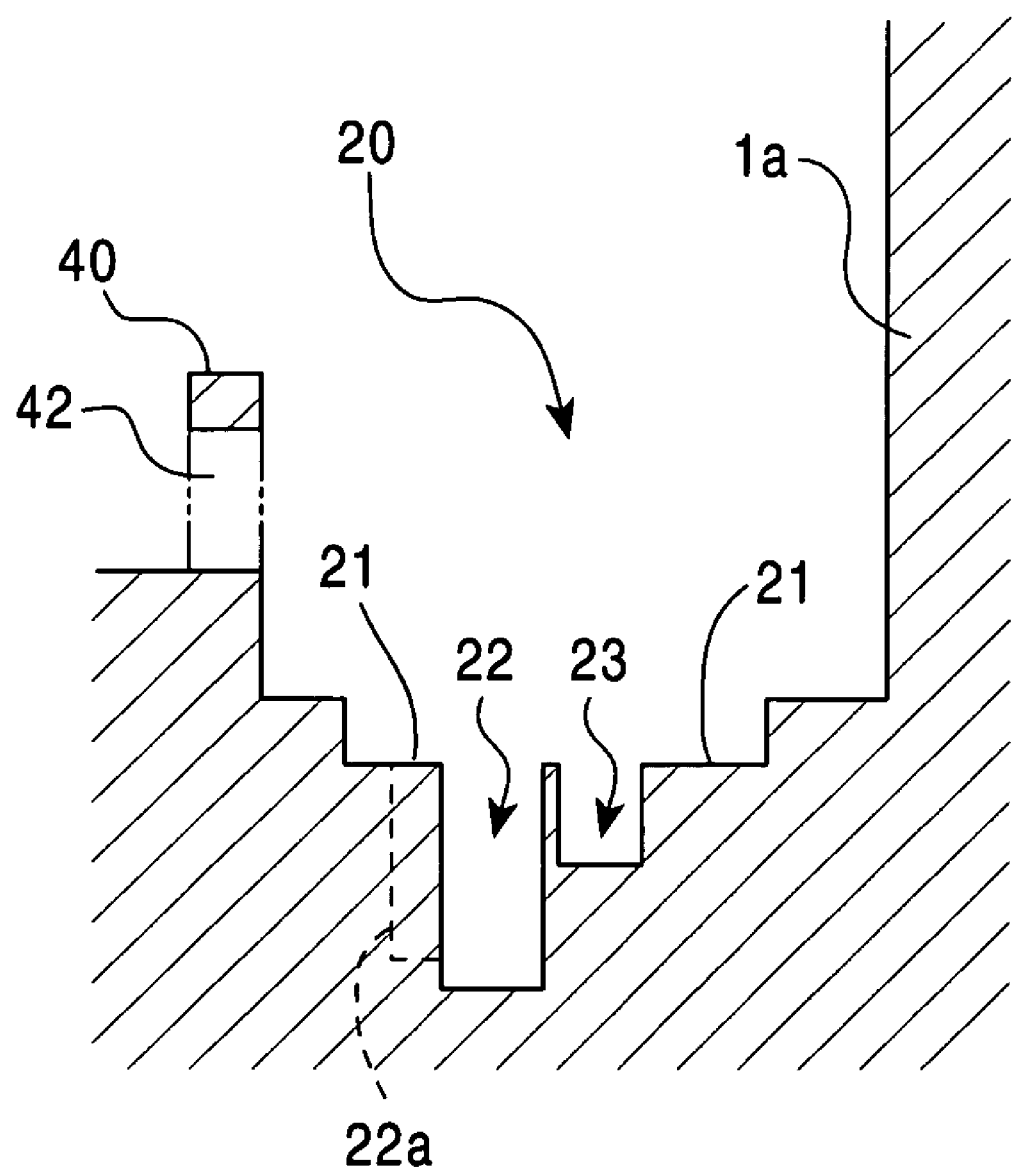
FIG. 5 is a sectional view taken along line L—L of FIG. 4.

Between the lefthand plate 1a and the accommodating room 2, there is formed a ridged groove portion 20b which includes a plurality of ridged grooves extending in the Z-direction and opened upward. The bottom portion of the ridged groove portion 20 includes plate sliding ridged grooves 21. In the bottom portions of these plate sliding ridged grooves 21, there are formed in parallel a cam groove 22 and a guide groove 23, which are transversely spaced from each other (as shown in FIGS. 4 and 5). In the inner side walls of the cam groove 22, there are formed three stopper portions 22a, 22b and 22c (although stopper portion 22a is not shown) which are longitudinally equidistantly spaced from one another.

In the vicinity of the Z-direction center of a lefthand side face 2a of the accommodating room 2, there are projected toward the center of the chassis 1 three bent cams 33a, 33b and 33c. These bent cams 33a, 33b and 33c are all formed to rise gradually upward from the front to the back and then to extend horizontally. In front of the bent cams 33a, 33b and 33c, there is disposed a flat portion 34 which allows vertical movement and which has no projection such as a cam.

At the back of the bent cams 33a, 33b and 33c, on the other hand, there are projected inward of the chassis 1 three horizontal cams 35a, 35b and 35c in parallel with one another. In front of these horizontal cams 35a, 35b and 35c, there is disposed a flat portion 36 which permits vertical movement which has no projection such as a cam.

At the righthand side face 2b confronting the lefthand side face 2a in the accommodating room 2, there are projected toward the center of the chassis 1 horizontal cams 35a', 35b' and 35c' (although not shown) which correspond to the horizontal cams 35a, 35b and 35c. In front of the horizontal cams 35a', 35b' and 35c', there is formed a vertical movement allowing portion 36' (although not shown) like the vertical movement allowing portion 36.

The top face of a partition 40 between the accommodating room 2 and the ridged groove portion 20 is formed of: a first shelf face 41a extending horizontally from the front to the back; a sloped face 41b sloped upward to the back; and a second shelf face 41c extending horizontally. The sloped face 41b is positioned in the vicinity of the bent cam 33a. Among the second shelf face 41c of the partition 40, the horizontal cam 35a and the vertical movement allowing portion 36, there is formed a rectangular aperture 42 which extends longitudinally through the partition 40 in the X-direction.

On the inner wall face 2c in front of the accommodating room 2, there are formed two L-shaped hooks 45 and 45' which are spaced in the X-direction from each other. Below the L-shaped hook 45, on the other hand, there is extended in the Z-direction a coil spring 46 which is fixed at its one end portion on the inner wall face 2c. As a result, the elastic biasing force of the coil spring 46 is established in the longitudinal direction, i.e., in the A-direction (as shown in FIG. 1) of the chassis 1.

On the beam 3 arranged at the back end portion of the accommodating room 2, there are formed a first guide plate 47 and a second guide plate 48 which are extended upward and spaced in the X-direction from each other. In the first guide plate 47, there is formed a rectangular guide hole 47a which extends vertically through the first guide plate 47. With the second guide plate 48, there is integrally formed a guide rail 48a which is projected forward and extended vertically.

Figure 6:
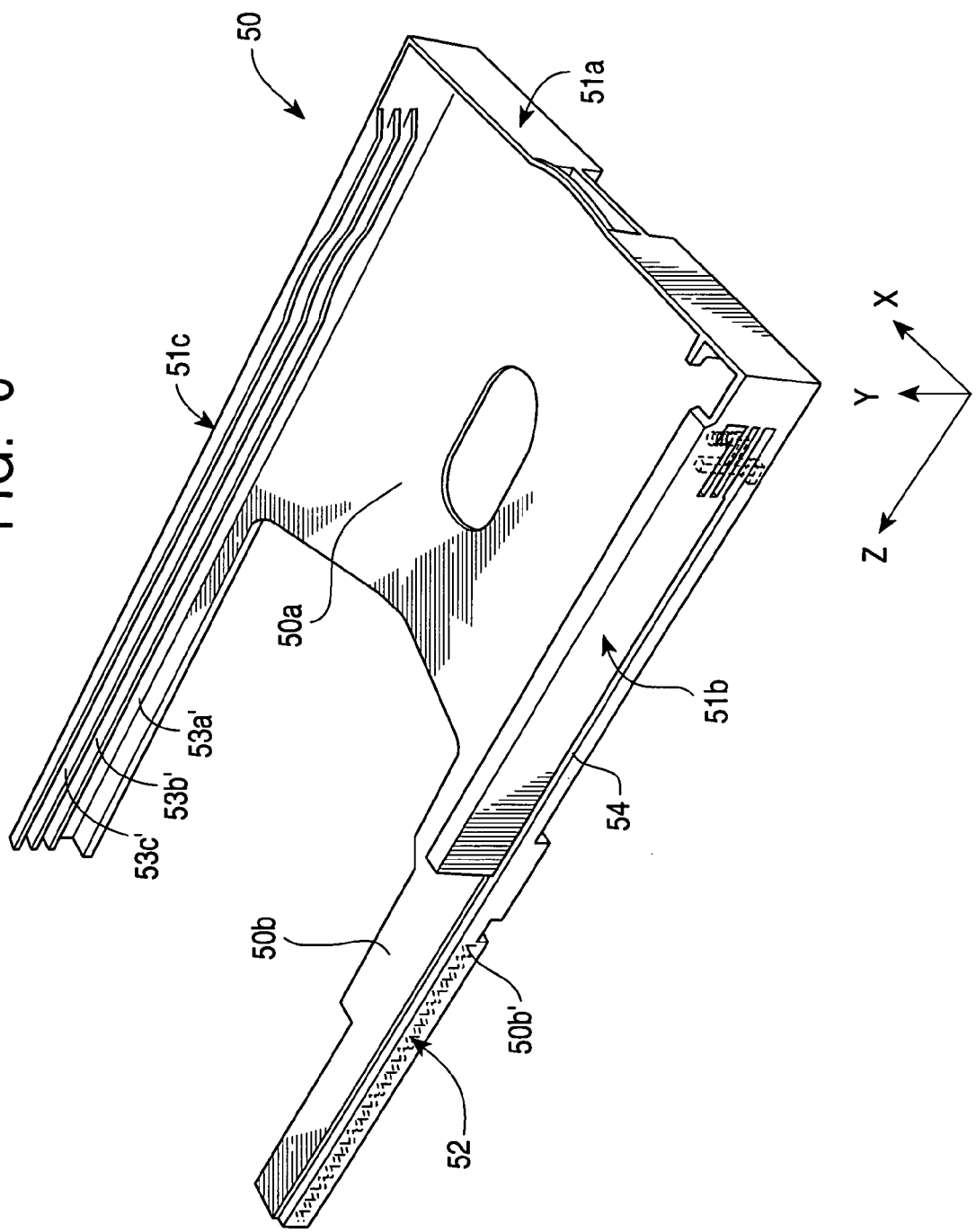
FIG. 6 is a perspective view of a main tray according to the invention.

With specific reference to FIG. 6, a main tray 50 includes a generally square bottom plate 50a, and a front plate 51a, a lefthand plate 51b and a righthand plate 51c extending upward from the bottom plate 50a thereby to enclose the three sides except for the back end portion of the bottom plate 50a. The righthand plate 51c further extends backward continuously from the back end portion of the bottom plate 50a.

On the lefthand back end portion of the bottom plate 50a, on the other hand, there is a backward extending bottom plate 50b which is extended backward from the bottom plate 50a. From and along the lefthand end potion of the backward extending bottom plate 50b, there is a downward a depending wall 50b'. On the inner side face of the depending wall 50b', there is formed a rack gear 52 which is directed in the X-direction.

In the inner side face of the right plate 51c, there are formed in the Z-direction three sub-tray holding grooves 53a', 53b' and 53c'which are opened inward. In the inner side face of the lefthand plate 51b, there are formed similar sub-tray holding grooves 53a, 53b and 53c (although not shown).

Figure 2:
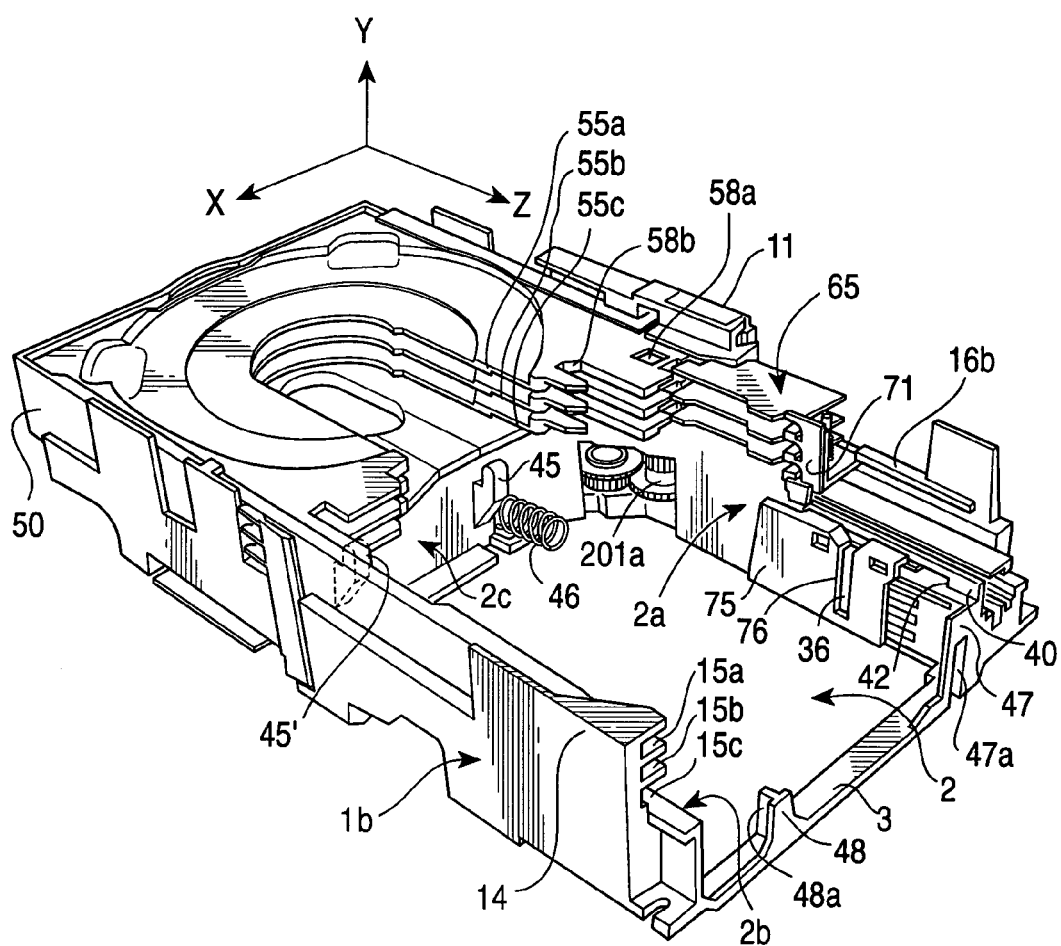
FIG. 2 is a perspective view of the disk player of FIG. 1 with its disk playing mechanism being removed.

In the vicinity of the lower end portion of the outer side face of the lefthand plate 51b, there is formed a guide groove 54 which is extended along the joint portion of the bottom plate 50a and opened outward. In the outer side face of the righthand plate 51c, too, there is formed a guide groove 54' which is opened outward in a manner to correspond to the guide groove 54. These guide grooves 54 and 54' engage with the plurality of main train guide projections 10a and 10b of the chassis 1 so that they may slide longitudinally. On the other hand, the rack gear 52, when main tray 50 is in a position of readiness (as shown in FIGS. 1 and 2), does not mesh with the pinion gear 201a of the tray moving mechanism 201 but can mesh with the pinion gear 201a when moved slightly forward.

Figure 7:
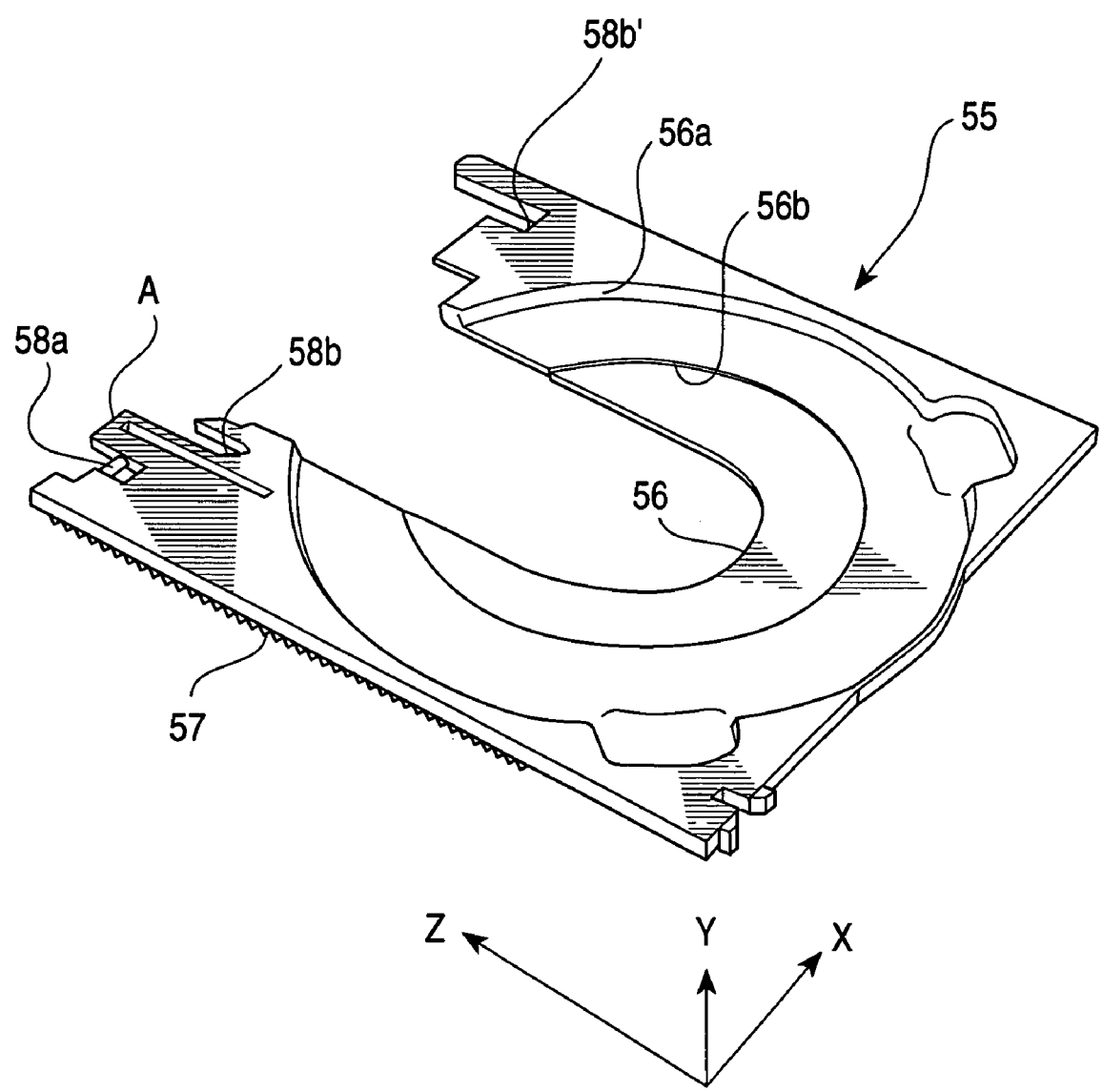
FIG. 7 is a perspective view of a sub-tray according to the invention.

With specific reference to FIG. 7, a sub-tray 55 is a generally square shaped plate member which has a cut-away portion 56 opened backward. The sub-tray 55 has recesses 56a and 56b formed to the size of the disks so that disks of different sizes can be placed on the recesses 56a and 56b. In the lefthand side end portion of the sub-tray 55, moreover, there is formed a rack gear 57 which is directed outward. In the vicinity of the back end portion of the rack gear 57, there is formed a square lock hole 58a which is vertically extended through the sub-tray 55. In the vicinities of the two back end portions of the sub-tray 55, there are formed two notches 58b and 58b' which are opened backward.

In the main tray 50, there can be laminated, vertically parallel sub-trays 55a, 55b and 55c which have the same size as that of the aforementioned sub-tray 55. The sub-trays 55a, 55b and 55c engage with the sub-tray holding grooves 53a and 53a', 53b and 53b', and 53c and 53c' of the main tray 50 so that they can individually slide longitudinally.

Figure 8:
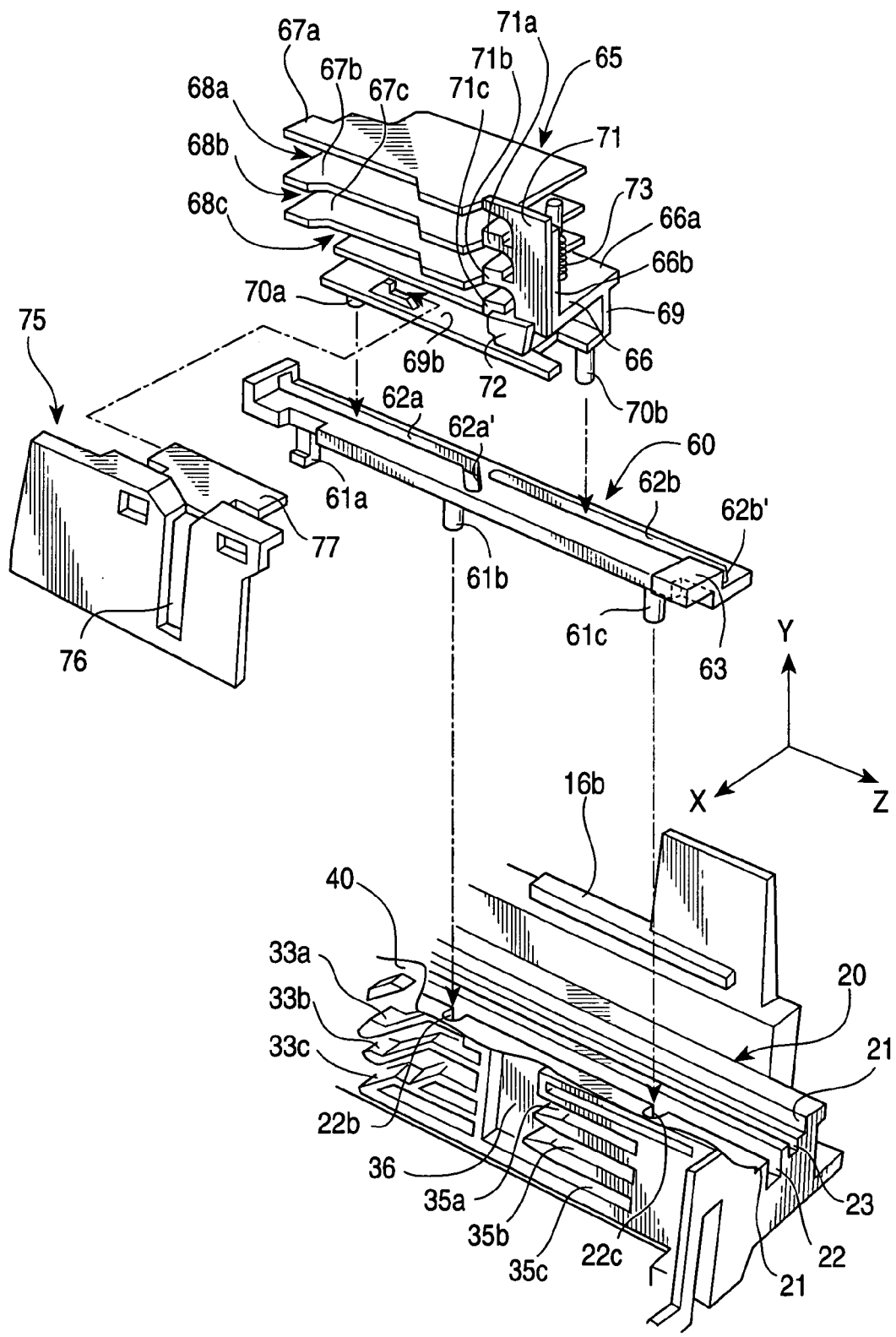
FIG. 8 is an exploded perspective view of a portion near a disk pull-in block according to the invention.
Figure 9:
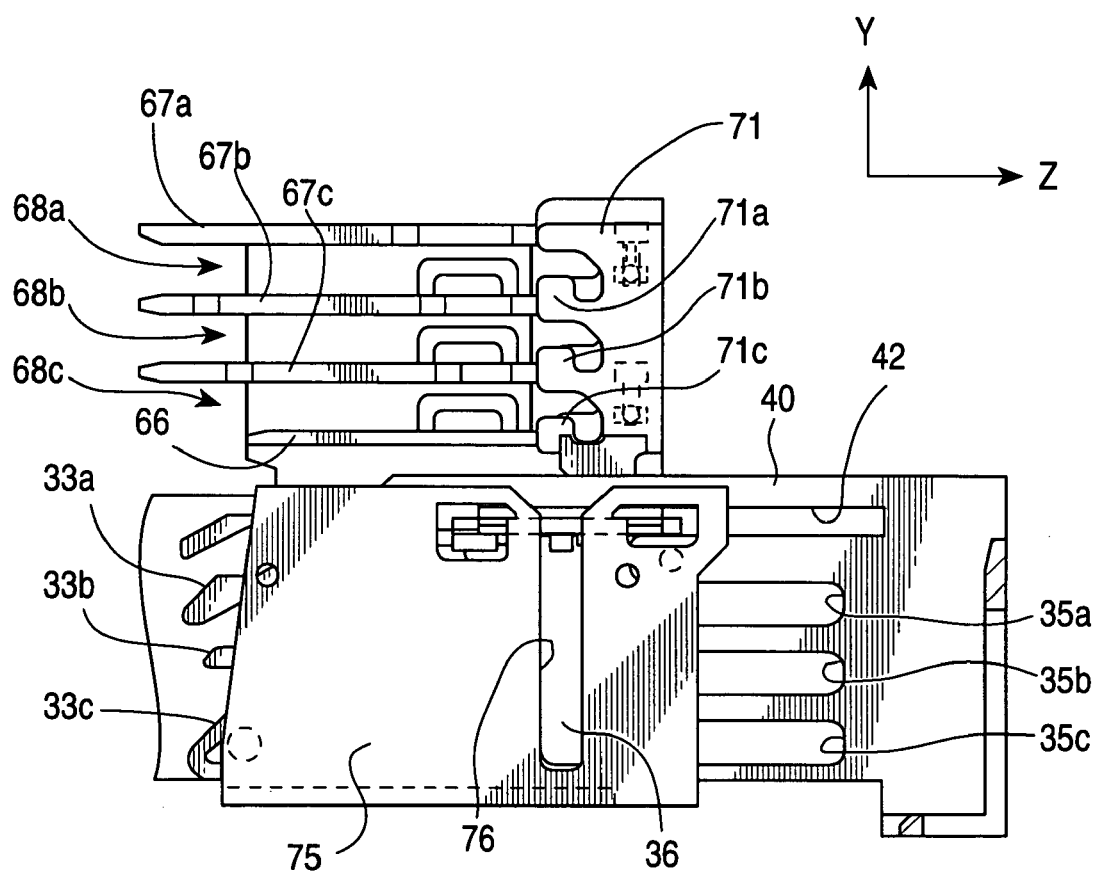
FIG. 9 is a side elevation of the vicinity of the disk pull-in block according to the invention.

With specific reference to FIG. 8, a cam plate 60 has three pins 61a, 61b and 61c extended downward. This cam plate 60 can slide longitudinally and transversely in the plate sliding ridged grooves 21 of the chassis 1, but these pins 61a, 61b and 61c engage with the stopper portions 22a (although not shown), 22b and 22c of the cam groove 22 of the chassis 1 so that the cam plate 60 cannot move longitudinally so long as it does not move leftward (i.e., backward of the X-direction). A first cam groove 62a and a second cam groove 62b are cam grooves which extend the cam plate 60 vertically, and have bent portions 62a' and 62b' which are extended from the front to the back and bent in the X-direction and sloped and extended continuosly. With the back end portion of the cam plate 60, there is integrally formed a plate-shaped projection lever 63 which is extended rightward. This projection lever 63 is so arranged that it can more into and out of the aperture 42 of the chassis 1 as the cam plate 60 moves rightward.

With specific reference to FIG. 8, a sub-tray pull-in block 65 has three sub-tray accommodating portions 68a, 68b and 68c which are constructed by spacing a base plate 66 and three partition plates 67a, 67b and 67c vertically in parallel. An outer side end portion 66a of the base plate 66 engages with the slide guides 16a and 16b of the chassis so that it can slide longitudinally. There is provided a bent depending portion 69 which is extended downward from the vicinity of the side end portion 66a and then rightward. On this bent depending portion 69, there are fixed column-shaped pins 70a and 70b which are spaced longitudinally from each other and extended downward. The pin 70a is extended so far through the first cam groove 62a of the cam plate 60 as to engage slidably with the guide groove 23 of the chassis 1. Likewise, the pin 70b is also extended so far through the second cam groove 62b of the cam plate 60 as to engage slidably with the guide groove 23 of the chassis 1. The bent depending portion 69 has a projection 69c which is further projected upward. In the vicinity of the z-direction end portion of the base plate 66, there is integrally formed a stopper fixing plate 66b which is extended upward.

A plate-shaped sub-tray fixing stopper 71 is mounted vertically slidably on that face of the stopper fixing plate 66b of the sub-tray pull-in block 65, which faces the inner side of the chassis 1. The sub-tray fixing stopper 71 has three forward extending arm portions, which are provided at their individual leading ends with projections 71a, 71b and 71c projecting upward. From the lower end portion of the sub-tray fixing stopper 71, on the other hand, there is formed a depending portion 72 which extends downward. The lower end portion of the depending portion 72 is located below the base plate 66. The sub-tray fixing stopper 71 is biased downward by a coil spring 73. So long as the sub-tray fixing stopper 71 is not forced upward, therefore, the lower end portion of the depending portion 72 is located below the base plate 66. The lower end portion of the depending portion 72 moves while sliding on the first shelf face 41a, the sloped face 41b and the second shelf face 41c as the sub-tray fixing stopper 71 moves.

A pull-in plate 75 has a notch 76 opened upward, and a lever 77 extending inward of the chassis 1 from the upper end portion. The notch 76 is positioned in the vicinity of the vertical moving allowing portion 36 of the lefthand side face 2a. The pull-in plate 75 is so arranged slidably in the Z-direction along the lefthand side face 2a of the accommodating room 2 that the lever 77 extends in the aperture 42 of the chassis 1. However, the projection lever 63 of the cam plate 60 abuts against the lever 77 from the back so that it cannot move backward so long as the cam plate 60 does not move to the outside of the chassis 1.

Figure 10:
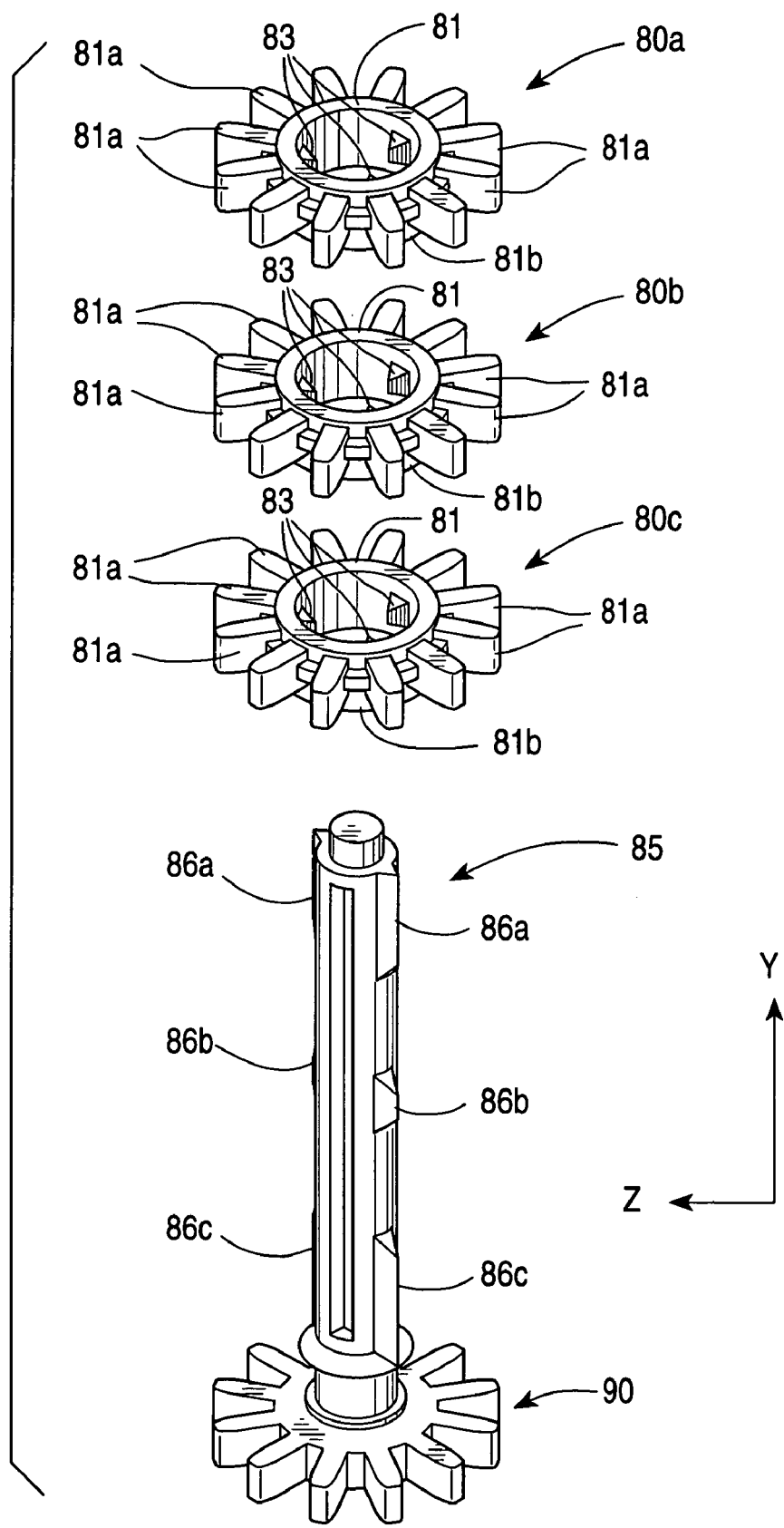
FIG. 10 is an exploded perspective view of portion loading gears and a shaft according to the invention.
Figure 11:
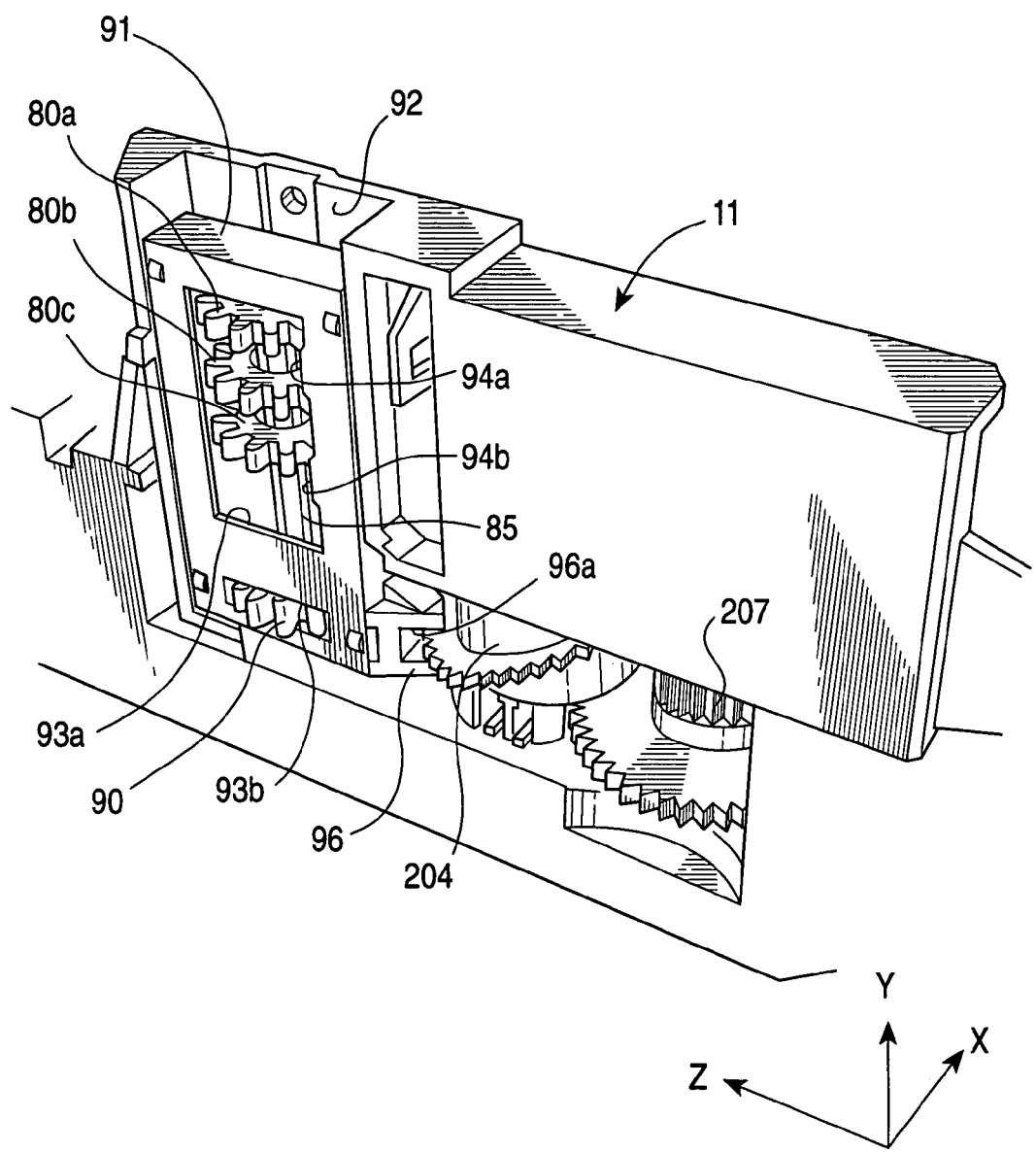
FIG. 11 is a perspective view of a portion of a sub-tray selecting mechanism according to the invention.
Figure 14:
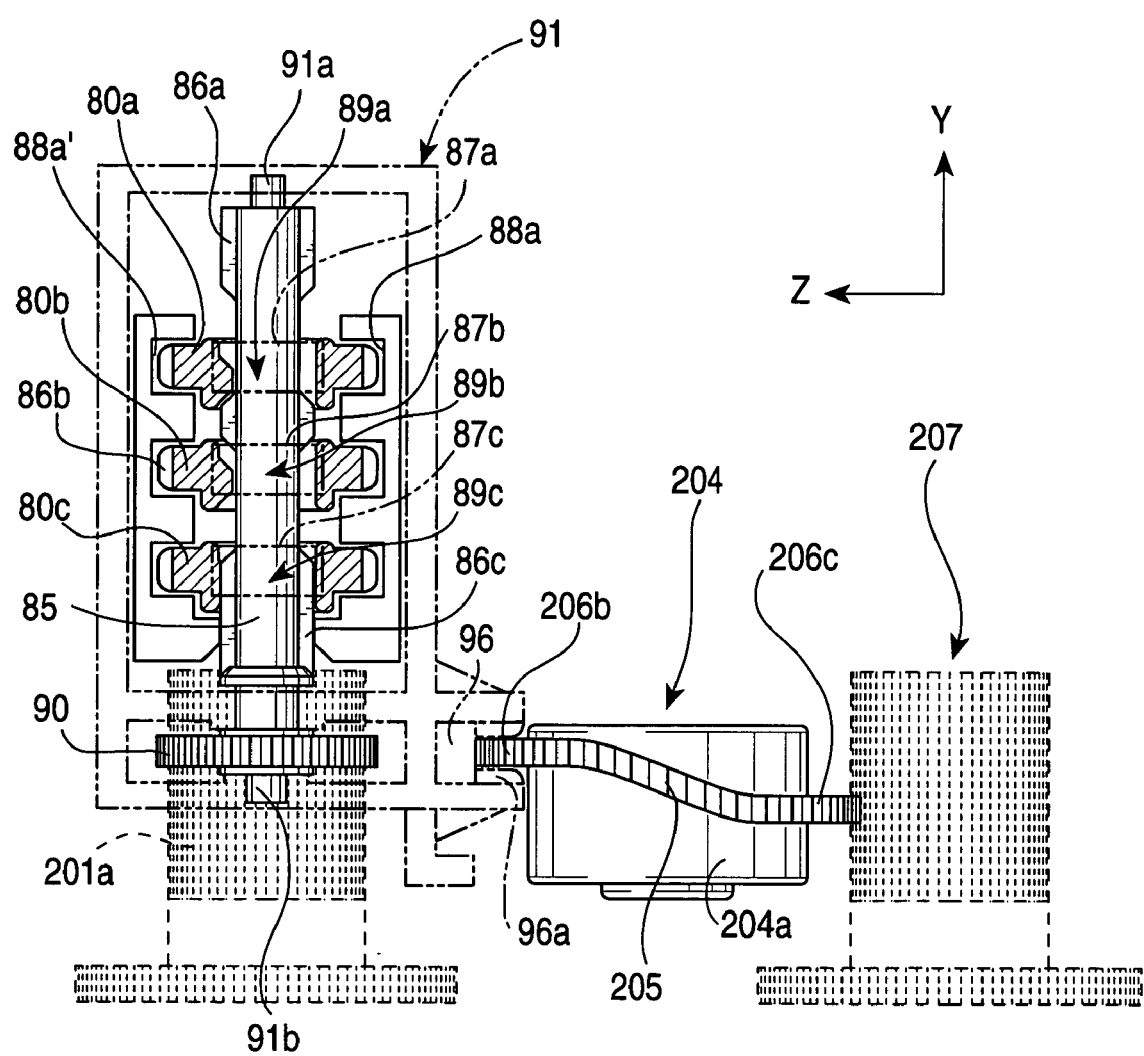
FIG. 14 is a conceptional diagram of the sub-tray selecting mechanism of FIG. 11.

As shown in FIGS. 10 and 14, each of first to third loading gears 80a, 80b and 80c is constructed to have: annular gear teeth 81a extending radially outward from portions of the outer circumference of a cylindrical portion 81; three projections 83 projecting inward of the cylindrical portion 81; and a flange portion 81b in which none of the annular gear teeth 81a are formed.

A column-shaped gear shaft 85 is provided with two first projections 86*a*, two second projections 86*b* and two third projections 86*c* which rise radially outward. On one end portion of the gear shaft 85, there is fixed a main gear 90 which meshes with the pinion gear 201*a* of the tray moving mechanism 201.

Through the first support plate 11 of the chassis 1, there are formed first to third rectangular apertures 87*a*, 87*b* and 87*c* which have individual communications with the first to third sub-tray supporting grooves 12*a*, 12*b* and 12*c*. From around the first aperture 87*a*, there is one set of confronting C-shaped portions 88*a* and 88*a*' which form a first gear accommodating portion 89*a* extended toward the outer side of the chassis 1 (or upward of the sheets of FIGS. 12 to 14). The C-shaped portions 88*a* and 88*a*' slidably support the annular gear teeth 82 of the first loading gear 80*a* from the upper and lower sides to prevent the first loading gear 80*a* from moving vertically. The leading end portions of the gear teeth 81*a* of the first loading gear 80*a*, as accommodated in the first gear accommodating portion 89*a*, project so far into the first sub-tray supporting groove 12*a* through the first aperture 87*a* as to engage with the rack gear 57 of the sub-tray 55*a* in the first sub-tray supporting groove 12*a*.

Here, the second and third loading gears 80*b* and 80*c* are also accommodated in second and third gear accommodating portions 89*b* and 89*c* and are projected through the second and third apertures 87*b* and 87*c* communicating with the second and third sub-tray supporting grooves 12*b* and 12*c* that they can engage with the individually rack gears 57 of the sub-trays 55*b* and 55*c*.

The gear shaft 85 is inserted vertically slidably into the individual cylindrical portions 81 of the first to third loading gears 80*a*, 80*b* and 80*c* in the first to third gear accommodating portions 89*a*, 89*b* and 89*c*.

A selector cover 91 can slide vertically along a vertical groove 92 which is formed in the first support plate 11 of the chassis 1. The selector lever 91 hinges the gear shaft 85 rotatably at its two upper and lower hinging portions 91*a* and 91*b*. The selector cover 91 has two apertures 93*a* and 93*b*. From the aperture 93*a*, the leading ends of the gear teeth 81*a* of the first to third loading gears 80*a*, 80*b* and 80*c* project outwardly. From the aperture 93*b*, the leading ends of the gear teeth of the main gear 90 project outwardly. On the other hand, projections 94*a* and 94*b* are formed on the aperture 93*a* so as to project inwardly. The selector cover 91 is provided at its front end portion with an elevator lever 96 which projects forwardly. In the end portion of the elevator lever 96, there is formed a recess 96*a* which is opened in the projecting direction. Here, the selector cover 91 is mounted on the chassis 1 together with a falling preventing cover 97.

In a bent gear 204, a gear portion 205 is made of gear teeth which are directed radially outward from a cylindrical portion 204*a* and bent vertically. The gear portion 205 is formed by arranging an upper gear portion 206*a*, a sloped gear portion 207, an intermediate gear portion 206*b*, a sloped gear portion 207, a lower gear portion 206*c* and a sloped gear portion 207 to be continuously annular at every one-sixths of the circumference of the cylindrical portion 204*a*. The upper gear portion 206*a*, the intermediate gear portion 206*b* and the lower gear portion 206*c* are all located vertically at fixed positions and extended around the cylindrical portion 204*a*, but the upper gear portion 206*a* is located over the intermediate gear portion 206*b*, which is located over the lower gear portion 206*c*. The gear portion 205 of the bent gear 204 is located in the recess 96*a* of the elevator lever 96 of the selector cover 91. On the other hand, the gear portion 205 meshes with the pinion gear 207 of the sub-tray selective drive mechanism 202. Here, the pinion gear 207 is formed to elongate vertically so that it always meshes with even the bent gear 204 having the aforementioned gear portions.

The construction of the disk playing mechanism 203 will be described next.

Figure 15:
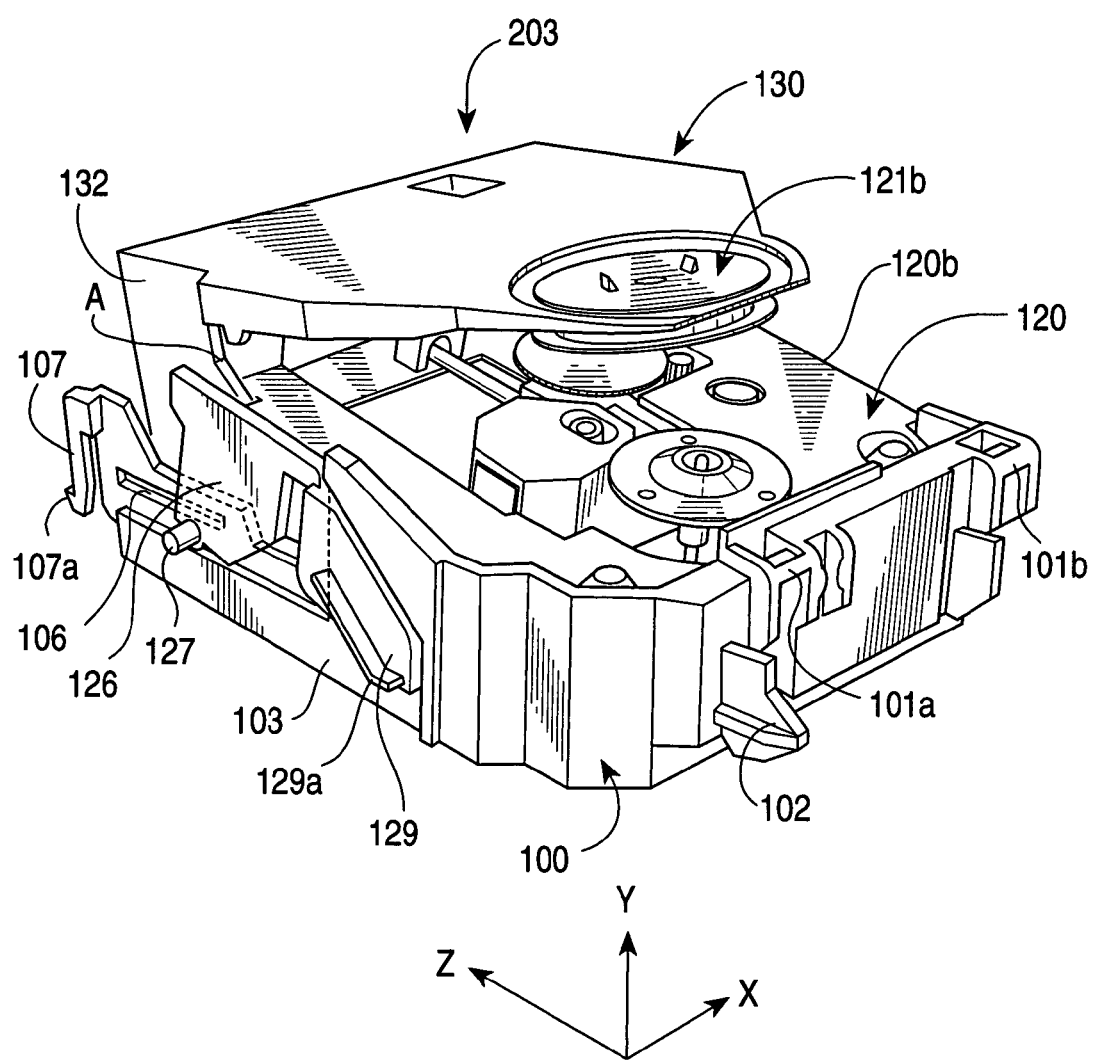
FIG. 15 is a perspective view of the disk playing mechanism of the disk player of FIG. 1.
Figure 16:
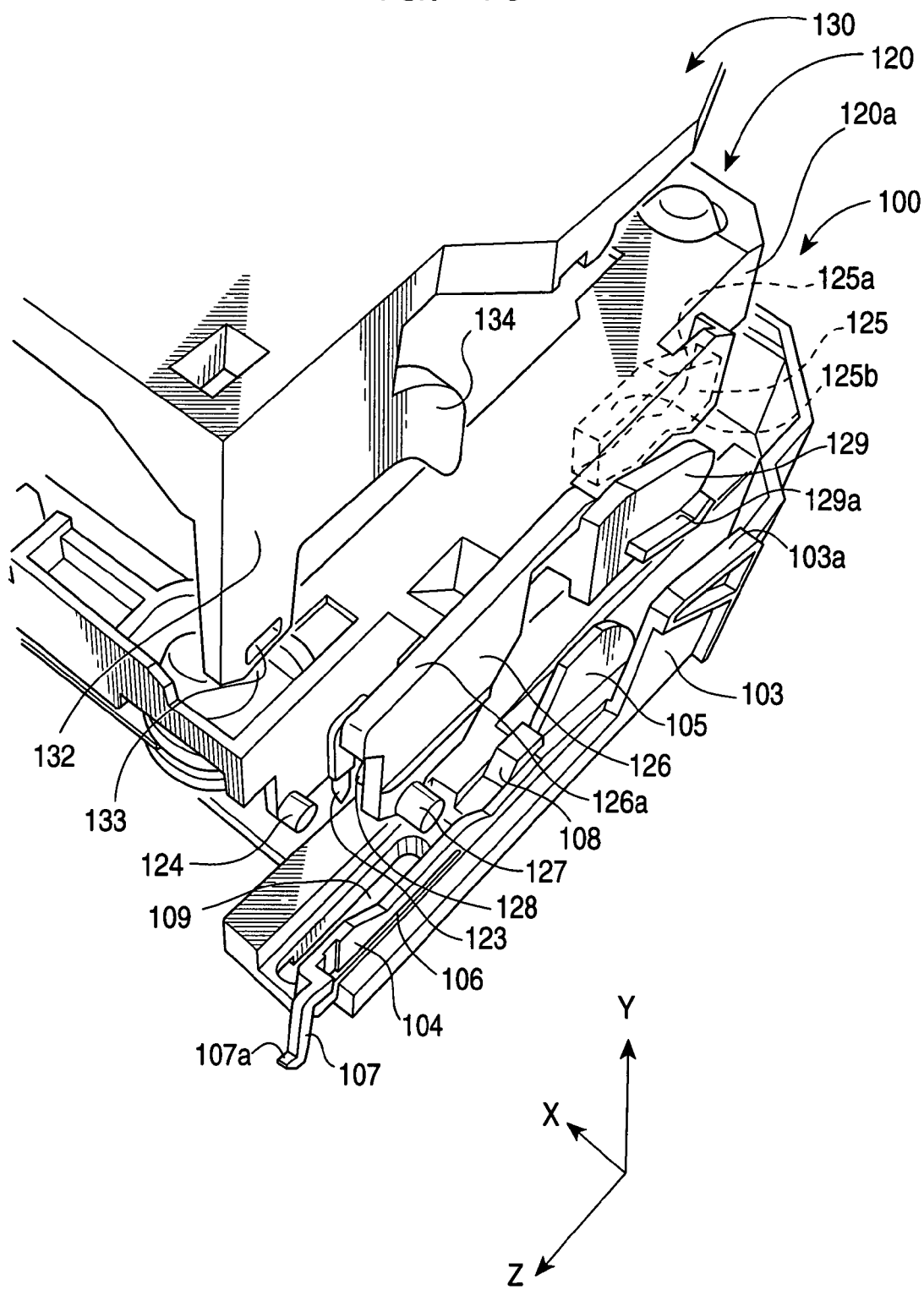
FIG. 16 is an exploded perspective view of a portion of the disk playing mechanism of the disk player of FIG. 1.

In a swing base 100, as shown in FIGS. 15 and 16, there are fixed on the forward face of the swing base 100 two hook receivers 101*a* and 101*b* which are transversely spaced from each other. These two hook receivers 101*a* and 101*b* individually engage downward with the L-shaped hooks 45 and 45' of the chassis 1 so that the swing base 100 can turn clockwise, as viewed in the X-direction. Below the hook receiver 101*a*, there is formed a spring receiver 102 which projects forward. This spring receiver 102 abuts against the spring 46 so that it is biased in the z-direction. Therefore, the swing base 100 is so biased at its back end portion that it can turn clockwise, as viewed in the X-direction. In the vicinity of the lefthand end portion of the swing base 100, there are upwardly formed a first plate 103, a second plate 104 and an internal slider 105 of a half disk shape, which are in parallel with one another. The first plate 103 is located at the lefthand most end portion. The second plate 104 is located in the vicinity of the back end portion of the swing base 100 and inside (or in the X-direction) of the first plate 103. The internal slider 105 is located at the back of the first plate 103 and inside of the second plate 104.

In the second plate 104, there is formed a float base turning slide groove 106 which is extended longitudinally through the second plate 104. In the righthand side face of the swing base 100, although not shown, a similar float base turning slide groove 106' which is paired with the float base turning slide groove 106. At the back end portion of the second plate 104, moreover, there is disposed a stopper arm 107 which is elongated backward and bent to depend continuously and which has a hooked stopper 107*a* formed at its leading end. The stopper arm 107 is located in the swing base guide hole 47*a* of the swing base guide plate 47 fixed on the beam 3 of the chassis 1 and is held in abutment at its leading end stopper 107*a* against the upper end portion of the guide hole 47*a*. Therefore, the swing base 100 is stopped, while being biased to turn clockwise, at the position where the stopper 107*a* abuts against the upper end portion of the guide hole 47*a*.

At the back of the internal slider 105, there is formed a clamper lever sliding sloped portion 108 which is sloped downward to the back. At the back of the clamper lever sliding sloped portion 108, there is formed a float base pin sliding groove 109 which is extended backward. At the back end portion of the swing base 100, there is formed a recessed rail receiving groove 110 (not-shown) which engages vertically slidably with the guide rail 48*a* formed on the second guide plate 48 of the beam 3 of the chassis 1.

A float base 120 is formed into an inverted U-shaped in the X-Y plane, in which a lower clamper 121*a*, a pickup 122 and so on are packaged. In the vicinity of the back end portion of a lefthand plate 120*a*, there is fixed a slide pin 123 which is extended downward. This slide pin 123 engages slidably in the float base pin sliding groove 109 of the swing base 100. At the back of the slide pin 123, there is formed a clamper holding projection 124 which is projected outward. At a righthand plate 120*b* paired with the lefthand plate 120*a*, although not shown, there is projected outward a clamper holder projection 124' which is paired with the clamper holder projection 124.

With the outer side face of the lefthand plate 120*a*, there is integrally formed a bag-shaped cam 125 which has an interior space. This bag-shaped cam 125 is opened downward and has, in its interior, a sloped face 125a sloped upward to the back and a horizontal face 125b extending horizontally backward continuously from the sloped face 125a. The bag-shaped cam 125 is arranged around the internal slider 105 of the swing base 100, and the top portion of the internal slider 105 engages longitudinally slidably with the sloped face 125a and the horizontal face 125b inside of the bag-shaped cam 125. Outside of the bag-shaped cam 125, there is extended backward a back fixing plate 126. Below the back end portion of the back fixing plate 126, there are disposed a height adjusting projection 127 and a float base turning projection 128 which are individually projected leftward and rightward. In the righthand plate 120b, there is projected a height adjusting projection 127' (not-shown) which corresponds to the height adjusting projection 127. This height adjusting projection 127 is located within the vertical movement allowing portion 36 of the chassis 1 through the notch 76 of the pull-in plate 75. On the other hand, the height adjusting projection 127' is located within the vertical movement allowing portion 36' of the chassis 1. Moreover, there is inwardly projected a (not-shown) float base turning projection 128' which corresponds to the float base turning projection 128. These float base turning projections 128 and 128' individually engage slidably with the float base turning slide grooves 106 and 106' of the swing base 100.

On the outer side and the front end portion of the back fixing plate 126, there is fixed a holding plate 129 which is extended forward. This holding plate 129 is provided with a cam 129a which is projected outward and which is sloped upward from downward to the back from the front. The holding plate 129 is located at the outer (or lefthand) side of the first plate 103 of the swing base 100.

In the vicinity of the front end portion of the clamper holder 130, there is fixed an upper clamper 121b. From the two side end portions in the vicinity of the back end portion of a clamper holder 130, on the other hand, there depend two depending portions 132 and 132'. In the vicinities of the lower end portions of these depending portions 132 and 132', there are formed (not-shown) through holes 133 and 133'. These through holes 133 and 133' individually engage rotatably with the clamper holder projections 124 and 124' of the front base 120. At the depending portion 132, moreover, there is formed a clamper lever 134 which extends forward in the shape of a quarter arc. This clamper lever 134 is located between the lefthand plate 120a of the float base 120 and the back fixing plate 126 and abuts at its leading end slidably against the clamper lever sliding sloped portion 108 of the swing base 100.

The operation of the disk player thus constructed will be described next.

When a disk is to be loaded or when an already loaded disk is to be exchanged, any of the sub-trays 55a, 55b and 55c that is desired to be loaded with the disk is selected by the operation of the operator, e.g., by turning ON a switch disposed on the not-shown control panel. Then, any one, as selected from the sub-trays in the standby positions (as shown in FIGS. 1 and 2) inside of the player, is discharged to the disk exchange position (as shown in FIG. 3) outside of the player.

First of all, here will be described the case in which the first sub-tray 55a, as located at the uppermost position, of the three sub-trays 55a, 55b and 55c is to be loaded with or exchanged with a disk.

Figure 12:
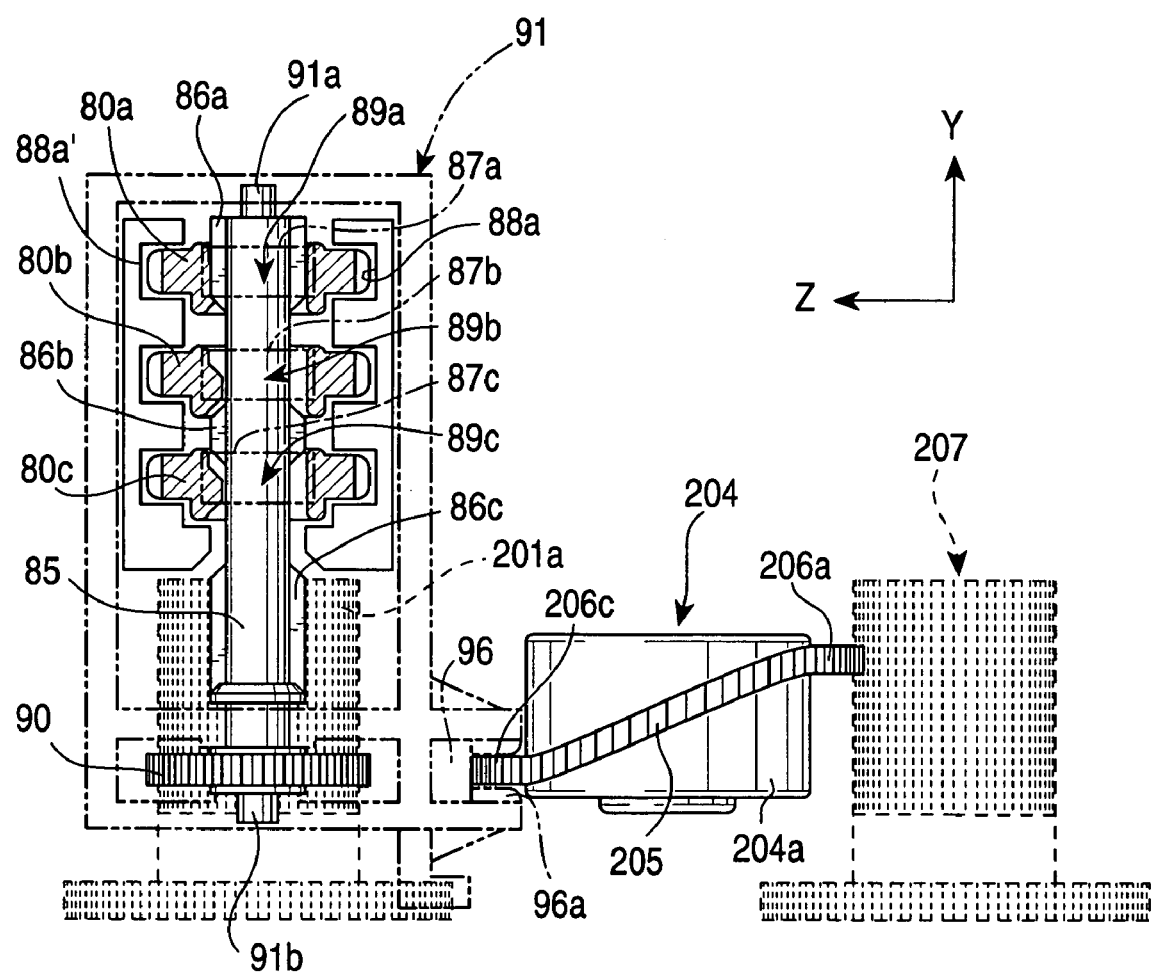
FIG. 12 is a conceptional diagram of the sub-tray selecting mechanism of FIG. 11.
Figure 13:
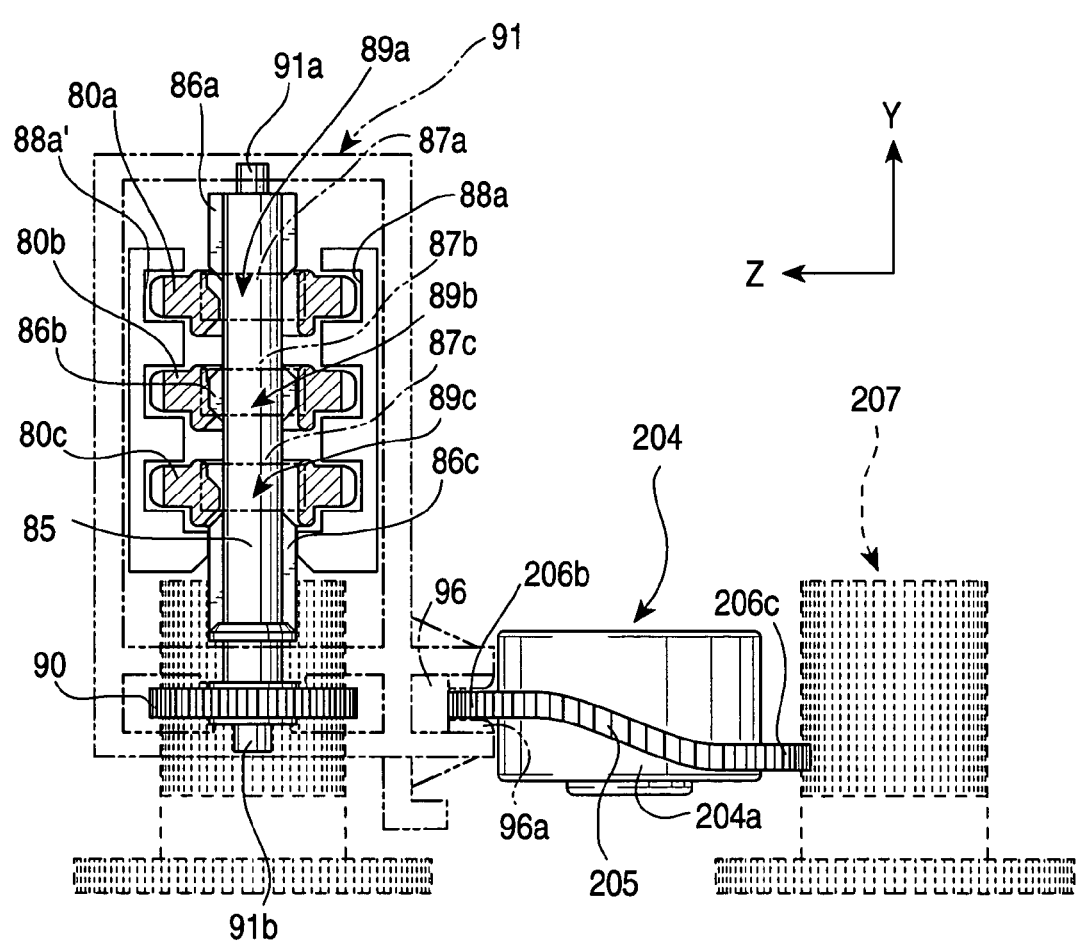
FIG. 13 is a conceptional diagram of the sub-tray selecting mechanism of FIG. 11.

In the state (as shown in FIGS. 1 and 2) where the three sub-trays 55a, 55b and 55c are arranged at the standby positions, as shown in FIGS. 12 to 14, the sub-tray selective drive mechanism 202 rotates the pinion gear 207 in response to an instruction to select the first sub-tray 55a, to turn the bent gear 204 meshing with the pinion gear 207. As the bent gear 204 turns, the recess 96a of the elevator lever 96 of the selector cover 91 is sequentially passed by the upper gear portion 206a, the sloped gear portion 207, the intermediate gear portion 206b, the sloped gear portion 207, the lower gear portion 206c and the sloped gear portion 207 of the gear portion 205 so that the selector cover 91 moves vertically in the vertical groove 92 of the chassis 1.

When the lower gear portion 206c of the gear portion 205 is positioned in the recess 96a of the elevator lever 96, the not-shown detecting mechanism is activated to stop the pinion gear 207 (as shown in FIG. 12). At this time, the selector cover 91 takes the lowermost position in the vertical groove 92 so that the first projection 86a of the gear shaft 85 comes into engagement with the projection 83 of the first loading gear 80a. At this time, moreover, the second projection 86b and the third projection 86c are not in engagement with the projections 83 of the second loading gear 80b and the third loading gear 80c. On the other hand, the projections 94a and 94b of the aperture 96a of the selector cover 91 are in abutment against the second loading gear 80b and the third loading gear 80c, respectively, to prevent the rotations of the gears.

When the pinion gear 207 is detected as stopped by the not-shown detection means, the tray moving mechanism 201 rotates the pinion gear 201a to turn the main gear 90 meshing with the pinion gear 201a. At this time, the gear shaft 85 rotates counter-clockwise, as viewed in the Y-direction. The driving force of the gear shaft 85 turns only the first loading gear 80a through the first projection 86a and the projection 83 of the first loading gear 80a. This first loading gear 80a drives the rack gear 57 of the first sub-tray 55a meshing therewith. This first sub-tray 55a moves the sub-tray holding grooves 53a and 53a' of the main tray 50 forward. Here, the second loading gear 80b and the third loading gear 80c are in abutment against the projections 94a and 94b of the aperture 96a of the selector cover 91, respectively, the second sub-tray 55b and the third sub-tray 55c cannot move from the standby positions.

When the first sub-tray 55a reaches the front end portion of the main tray 50, the not-shown lock means on the main tray 50 fixes the first sub-tray 55 in the sub-tray holding grooves 53a and 53a' of the main tray 50. Simultaneously with this, the main tray 50 is slightly pushed forward by the first sub-tray 55a so that the rack gear 52 of the main tray 50 moves forward to come into meshing engagement with the pinion gear 201a, but the rack gear 57 and the pinion gear 201a go out of meshing engagement. The main tray 50 moves forward together with the first sub-tray 55a.

When the main tray 50 reaches the disk exchanging position (as shown in FIG. 3), the not-shown switch for detecting the position of the main tray 50 is turned ON to stop the rotation of the pinion gear 201a so that the disk can be exchanged/loaded.

When the loading/exchange of the first sub-tray 55a with the disk is ended, the switch of the tray moving mechanism 201 is turned ON by the operation of the operator. Then, the pinion gear 201a rotates backward of the direction of the aforementioned case in which the main tray 50 is to be discharged, so that the main tray 50 moves backward to the standby position. Just before the standby position, the rack gear 52 of the main tray 50 goes out of meshing engagement with the pinion gear 201a. Simultaneously with this, the pinion gear 201a meshes with the rack gear 57 of the first sub-tray 55a. On the other hand, the not-shown lock means on the main tray 50 is released to unlock the sub-tray holding grooves 53a and 53a' of the main tray 50 and the first sub-tray 55. Moreover, the not-shown switch for detecting the position of the main tray 50 is turned ON to stop the tray moving mechanism 201 thereby to establish the standby state.

Here will be described the case in which the third sub-tray 55c positioned at the lower step is to be loaded or exchanged with the disk.

In response to the instruction to select the third sub-tray 55c at the standby position, the sub-tray selective drive mechanism 202 rotates the pinion gear 207 thereby to turn the bent gear 204 meshing with the pinion gear 207. When the upper gear portion 206a of the gear portion 205 is positioned in the recess 96a of the elevator lever 96, the not-shown means detects this positioning to stop the pinion gear 207 (as shown in FIG. 14). At this time, the selector cover 91 is located in the vertical groove 92 in the uppermost position, and the third projection 86c of the gear shaft 85 is in engagement with the projection 83 of the third loading gear 80c. At this time, the first projection 86a and the second projection 86b are not in engagement with the projections 83 of the first loading gear 80a and the second loading gear 80b. On the other hand, the projections 94a and 94b of the aperture 93a of the selector cover 91 are in abutment against the first loading gear 80a and the second loading gear 80b, respectively, to prevent the rotations of these gears. Therefore, the first sub-tray 55a and the second sub-tray 55b cannot move from the standby positions. The subsequent operations are similar to those of the aforementioned case of the first sub-tray 55a so that their description will be omitted.

Here will be described the case in which the second sub-tray 55b, as located at the intermediate position, of the three sub-trays 55a, 55b and 55c is to be loaded or exchanged with the disk.

In response to the instruction to select the second sub-tray 55b at the standby position, the sub-tray selective drive mechanism 202 rotates the pinion gear 207 to turn the bent gear 204 meshing with the pinion gear 207. When the intermediate gear portion 206b of the gear portion 205 is positioned in the recess 96a of the elevator lever 96, the not-shown mechanism for detecting this positioning acts to stop the pinion gear 207 (as shown in FIG. 13). At this time, the selector cover 91 is positioned in the vertical groove 92 at the position intermediate of the position of the selector cover 91 of the aforementioned loading/exchanging cases of the first and third sub-trays 55a and 55c with the disk. The second projection 86b of the gear shaft 85 is in engagement with the projection 83 of the second loading gear 80b. At this time, the first projection 86a and the third projection 86c are not in engagement with the projections 83 of the first loading gear 80a and the third loading gear 80c. On the other hand, the projections 94a and 94b of the aperture 93a of the selector cover 91 are in abutment against the first loading gear 80a and the third loading gear 80c, respectively, to prevent the rotations of these gears. Therefore, the first sub-tray 55a and the third sub-tray 55c cannot move from the standby positions. The subsequent operations are similar to those of the aforementioned cases in which the first and third sub-trays 55a and 55c are to be loaded or exchanged with the disk so that their description will be omitted.

With reference to the conceptional diagrams of FIGS. 17 to 23 in addition to FIGS. 1 to 16, next to be described the case in which the information recorded in the disk is to be reproduced.

Figure 17:
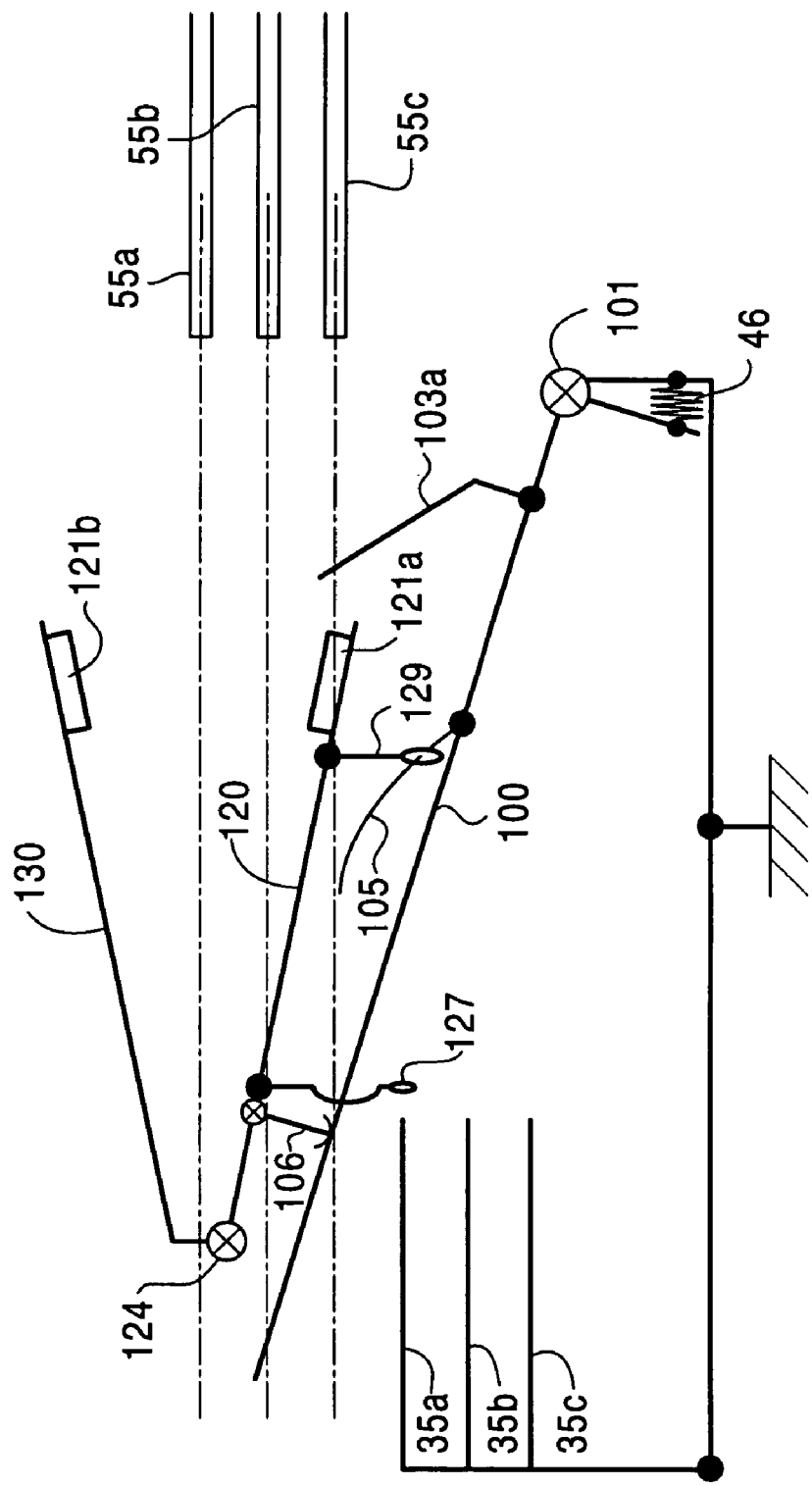
FIG. 17 is a conceptional diagram of a disk transfer mechanism in the state where three sub-trays are positioned at standby positions.
Figure 18:
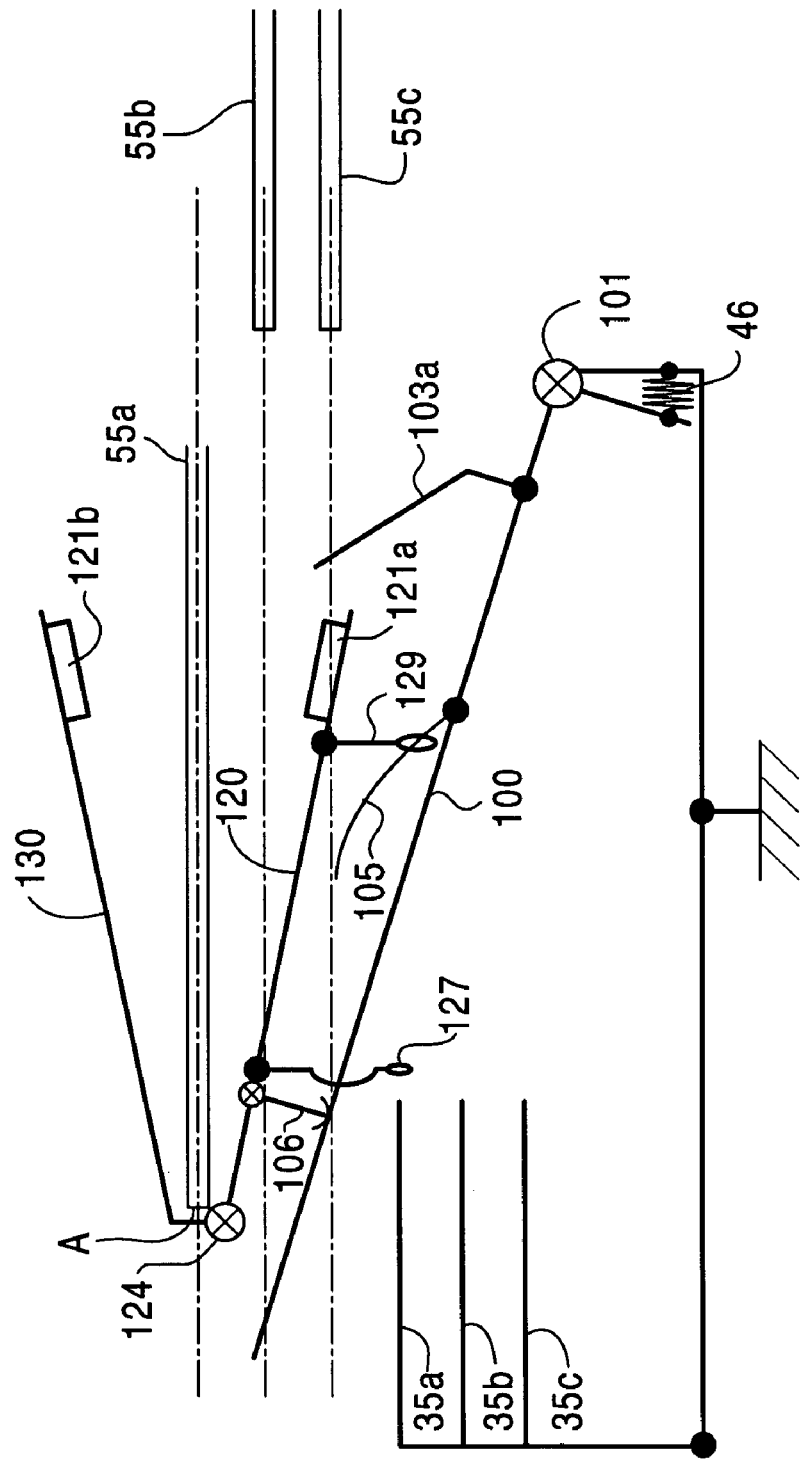
FIG. 18 is a conceptional diagram of an essential portion of the disk transfer mechanism in the state where the first sub-tray is being transferred to the disk playing mechanism.

A disk, as desired to be played, is selected when the switch disposed on the not-shown control panel is turned ON by the operator. Then, the operation is started to move any of the sub-trays 55a, 55b and 55c stacked at the standby positions (as shown in FIG. 17), that places the desired disk thereon, to the disk playing mechanism 203.

First of all, here will be described the operations to transfer the disk placed on the first sub-tray 55a from the standby position to the disk playing mechanism 203 thereby to play the information recorded in the disk.

As in the case of loading or exchanging the disk, the sub-tray selective drive mechanism 202 rotates the pinion gear 207 to turn the bent gear 204 meshing with the pinion gear 207. Therefore, the selector cover 91 moves vertically in the vertical groove 92 of the chassis 1.

When the lower gear portion 206c of the gear portion 205 is located in the recess 96a of the elevator lever 96, the not-shown mechanism detects the positioning to stop the pinion gear 207 (as shown in FIG. 12). At this time, the first projection 86a of the gear shaft 85 is in engagement with the projection 83 of the first loading gear 80a, but the second projection 86b and the third projection 86c are not in engagement with the projections 83 of the second loading gear 80b and the third loading gear 80c. On the other hand, the projections 94a and 94b of the aperture 96a of the selector cover 91 are in abutment against the second loading gear 80b and the third loading gear 80c, respectively, so that the second loading gear 80b and the third loading gear 80c cannot rotate.

When the pinion gear 207 is detected as stopped by the not-shown detection means, the tray moving mechanism 201 rotates the pinion gear 201a to turn the main gear 90 meshing with the pinion gear 201a. The rotating direction of this pinion gear 201a is reversed from that of the aforementioned disk loading/exchanging case. This rotation is transmitted through the first projection 86a of the shaft 85 and the projection 83 of the first loading gear 80a, as meshing with each other, to the first loading gear 80a. This first loading gear 80a drives the rack gear 57 of the first sub-tray 55a, as meshing therewith. Therefore, the first sub-tray 55a proceeds backward in the inside of the sub-tray accommodating portion 68a of the sub-tray pull-in block 65.

The first sub-tray 55a comes, when it reaches the back end portion of the sub-tray accommodating portion 68a of the sub-tray pull-in block 65, into abutment against the sub-tray fixing stopper 71 to push the sub-tray pull-in block 65 further backward. At this time the depending portion 72 of the sub-tray fixing stopper 71 slides from the first shelf face 41a of the partition 40 through the sloped face 41b to the second shelf face 41c so that it is forcibly raised. Therefore, the projection 71a of the sub-tray fixing stopper 71 is raised to come up into engagement with the lock hole 58a of the first sub-tray 55a from downward.

As the first sub-tray 55a proceeds further backward, the pin 70a extending downward from the sub-tray pull-in block 65 reaches the bent portion 62a' in the vicinity of the back end portion of the first cam groove 62a of the cam plate 60. Likewise, the pin 70b of the sub-tray pull-in block 65 reaches the bent portion 62b' in the vicinity of the back end portion of the second cam groove 62b of the cam plate 60. As the pins 70a and 70b proceed backward around the bent portions 62a' and 62b' of the first cam groove 62a and the second cam groove 62b, respectively, the cam plate 60 is moved outward of the chassis 1. Therefore, the projection lever 63 of the cam plate 60 moves from the aperture 42 of the chassis 1 to the outside of the chassis 1 so that the pull-in plate 75 is disengaged from the lever 77 and allowed to move backward. At this time, the end portion A (as shown in FIG. 15) at the depending portion 132 of the clamper holder 130 is located in the notch 58b of the back end portion of the first sub-tray 55a.

Moreover, the first sub-tray 55a comes into engagement, when the sub-tray pull-in block 65 is pushed backward so that the projection 69c on the bent depending portion 69 of the sub-tray pull-in block 65 and the lever 77 of the pull-in plate 75 abut against each other. In short, the sub-tray pull-in block 65 and the pull-in plate 75 are pushed backward by the backward movement of the first sub-tray 55a. The notch 76 of the pull-in plate 75 is in engagement with the height adjusting projection 127 of the float base 120 so that the height adjusting projection 127 is pulled backward in the horizontal cam 35a of the chassis 1 by the pull-in plate 75. Likewise, the other height adjusting projection 127' is also pulled in backward while sliding on the horizontal cam 35a' of the chassis 1. On the other hand, the cam 129a of the holding plate 129 is pulled in backward while sliding on the bent cam 33a of the chassis 1.

By the backward movements of the height adjusting projections 127 and 127' engaging with the pull-in plate 75, the float base 120 and the clamper holder 130 proceed backward with respect to the swing base 100.

The leading end of the clamper lever 134 of the clamper holder 130 proceeds backward while sliding on the clamper lever sliding sloped portion 108 of the swing base 100, so that the leading end of the clamper lever 134 moves downward. On the clamper holder projections 124 and 124', therefore, the front end portion of the clamper holder 130 turns clockwise or downward, as viewing the disk playing mechanism 203 in the X-direction.

Figure 19:
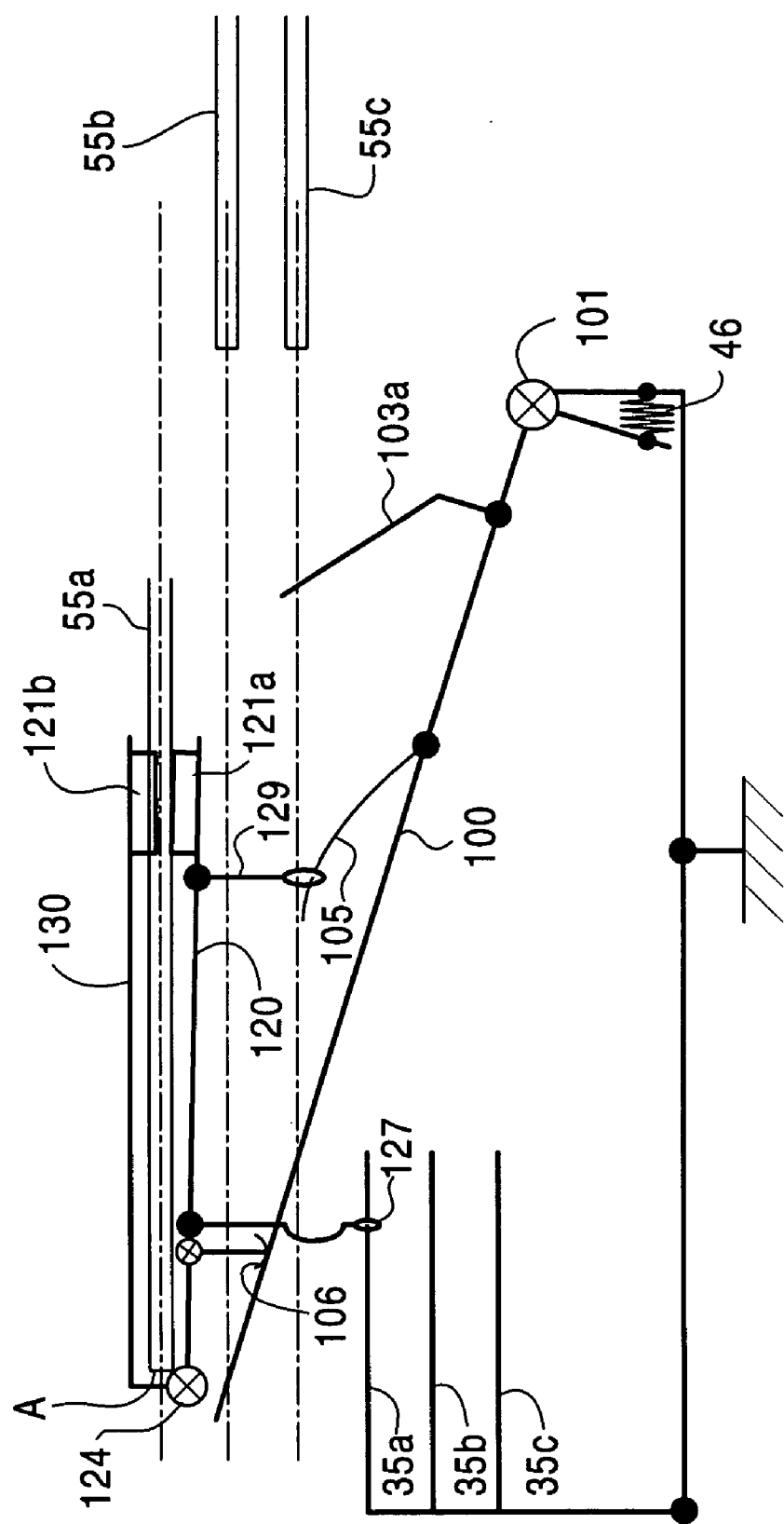
FIG. 19 is a conceptional diagram of the disk transfer mechanism in the state where the first sub-tray has been transferred to the disk playing mechanism.

When the top portion of the internal slider 105 of the swing base 100 in abutment against the horizontal face 125b in the bag-shaped cam 125 of the front base 120 reaches the sloped face 125a, the float base 120 turns on the float base turning projection 128. In other words, the float base turning projection 128 proceeds while sliding and turning in the float base turning slide groove 106 of the swing base 100. Therefore, the front end portion of the float base 120 turns on the float base turning projection 128 counter-clockwise, as viewing the float base 120 in the X-direction. In other words, the lower clamper 121a and the upper clamper 121b constructing one clamper move toward each other to clamp the disk through the cut-away portion 56 of the first sub-tray 55a (as shown in FIG. 19). When the disk is clamped, the not-shown mechanism for detecting this clamping acts to stop the tray moving mechanism 201 so that the information recorded in the disk can be reproduced.

Even while the information recorded in the disk is being reproduced with the disk being clamped, as described above, the tray moving mechanism 201 and the sub-tray selective drive mechanism 202, i.e., an independent drive mechanism can be activated. By driving the sub-tray selective drive mechanism 202 to disengage the first projection 86a of the gear shaft 85 and the projection 83 of the first loading gear 80a, the tray moving mechanism 201 can be brought into engagement with the other sub-tray 55b or 55c. Even while the information recorded in the disk placed on the first sub-tray 55a is being reproduced, therefore, the sub-tray 55b or 55c can be loaded or exchanged with a disk.

Here will be described the operations for transferring a disk, as placed on the second sub-tray 55b, from the standby position to the disk playing mechanism 203 to reproduce the information recorded in the disk.

If the disk desired to reproduce the recorded information is selected as in the case of the first sub-tray 55a, the instruction to recognize the sub-tray having the disk placed thereon is set by the operation of the operator to the sub-tray selective drive mechanism 202. This sub-tray selective drive mechanism 202 rotates the pinion gear 207 till the intermediate gear portion 206b of the gear portion 205 of the bent gear 204 comes into the recess 96a of the elevator lever 96, so that the selector cover 91 is vertically moved in the vertical groove 92 of the chassis 1.

When the pinion gear 207 is detected as stopped by the not-shown detection means, the tray moving mechanism 201 rotates the pinion gear 201a to rotate the main gear 90 meshing with the pinion gear 201a. This rotation is transmitted through the second projection 86b of the shaft 85 and the projection 83 of the second loading gear 80b, as meshing with each other, to the second loading gear 80b. This second loading gear 80b drives the rack gear 57 of the second sub-tray, as meshing therewith, to move the second sub-tray 55b backward.

The back end portion A of the second sub-tray 55b proceeds backward while abutting against and sliding on the face 126a of the upward top of the back fixing plate 126 of the float base 120. At this time, the second sub-tray 55b pushes the back fixing plate 126 of the float base 120 downward so that the swing base 100 turns on the L-shaped hooks 45 and 45' of the chassis 1 counter-clockwise, as viewing the swing base 100 in the X-direction, that is, the back end portion of the swing base 100 turns downward.

When the second sub-tray 55b proceeds backward in the sub-tray accommodating portion 68b of the sub-tray pull-in block 65 and reaches the back end portion of the sub-tray pull-in block 65, moreover, the projection 71a of the sub-tray fixing stopper 71 comes up into engagement with the lock hole 58a of the second sub-tray 55b.

Figure 20:
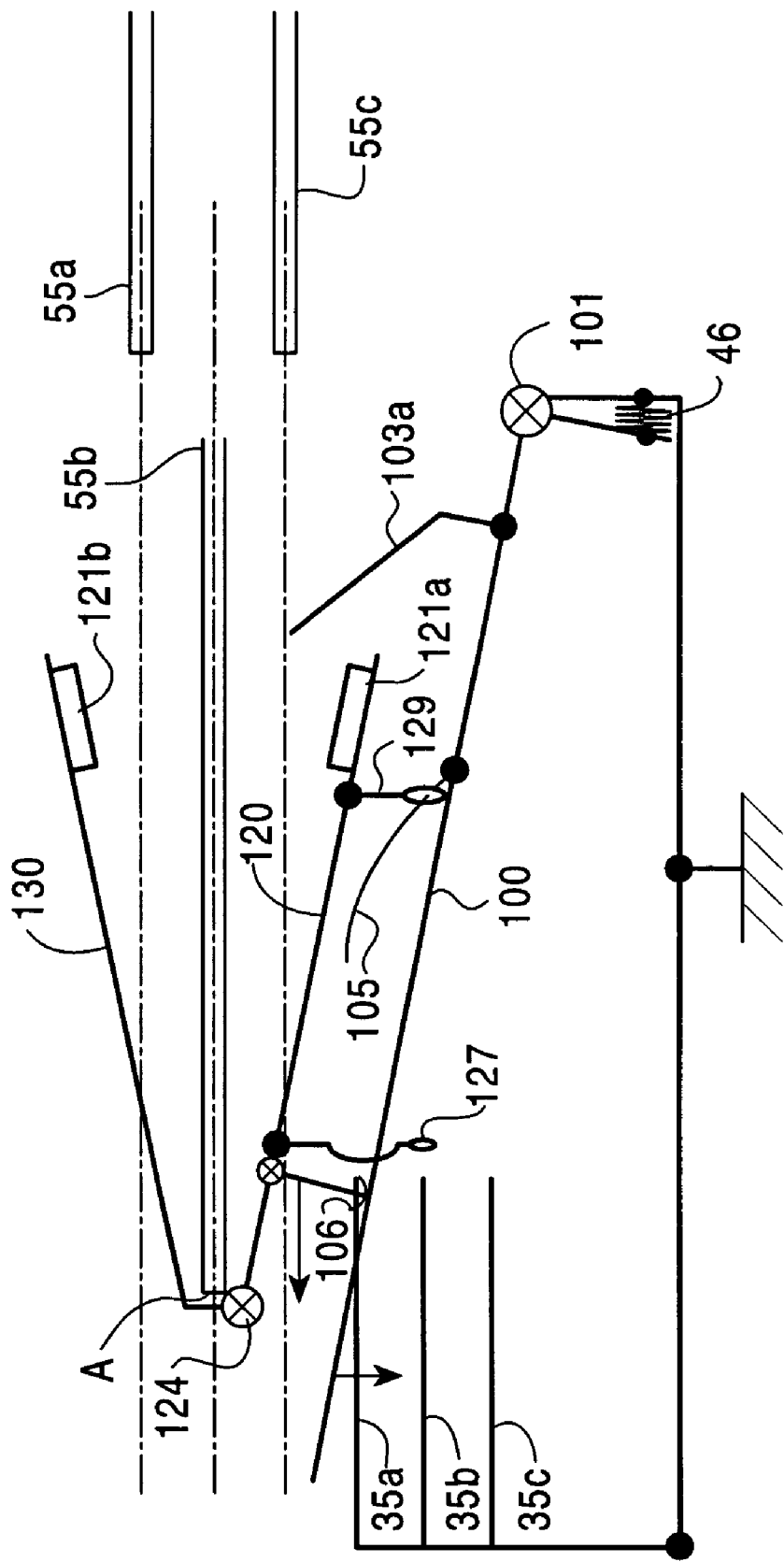
FIG. 20 is a conceptional diagram of an essential portion of the disk transfer mechanism in the state where the second sub-tray is on the way to be transferred to the disk playing mechanism.

When the end portion A of the depending portion 132 of the clamper holder 130 is positioned in the notch 58b located at the back end portion of the second sub-tray 55b, the projection 69c of the sub-tray pull-in block 65 and the lever 77 of the pull-in plate 75 abut and engage as in the aforementioned case of the first sub-tray 55a, so that the pull-in plate 75 is pushed backward (as shown in FIG. 20). At this time, the swing base 100 has turned, as described above, so that the height adjusting projections 127 and 127' of the float base 120 are pulled backward in the horizontal cams 35b and 35b', respectively, as located below the horizontal cams 35a and 35a'. On the other hand, the cam 129a of the holding plate 129 is pulled in backward while sliding on the bent cam 33b of the chassis 1.

Figure 21:
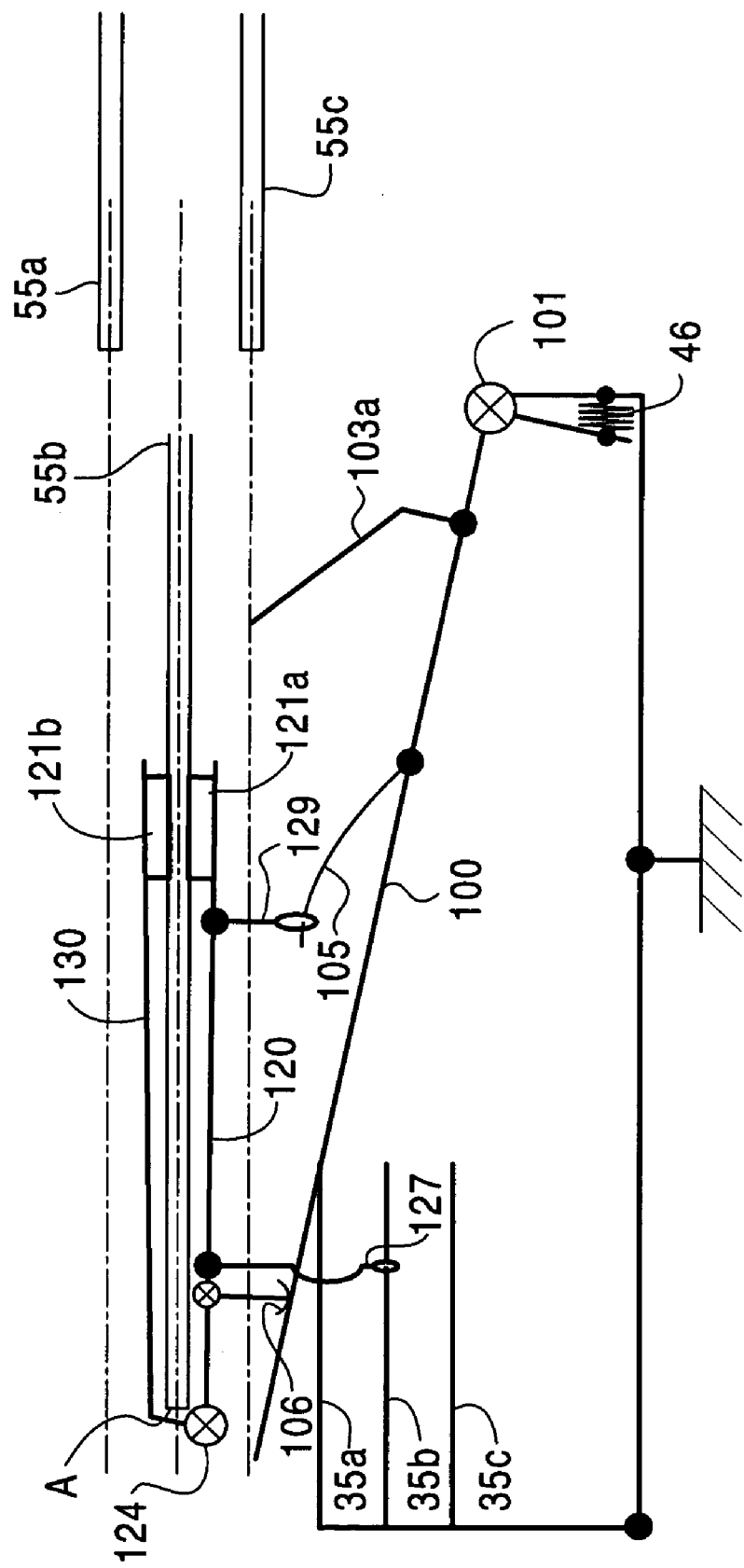
FIG. 21 is a conceptional diagram of the disk transfer mechanism in the state where the second sub-tray has been transferred to the disk playing mechanism.

By the backward movement of the second sub-tray 55b, moreover, the pull-in plate 75 moves to clamp the disk (as shown in FIG. 21). However, these operations are similar to those of the aforementioned case of the first sub-tray 55a so that their detailed description will be omitted.

Here will be described the operations for transferring the disk, as placed on the third sub-tray 55c, from the standby position to the disk playing mechanism 203, to reproduce the information recorded in the disk.

If the disk desired to reproduce the recorded information is selected as in the case of the first sub-tray 55a, the instruction to recognize the sub-tray having the disk placed thereon is set by the operation of the operator to the sub-tray selective drive mechanism 202. This sub-tray selective drive mechanism 202 rotates the pinion gear 207 so that the upper gear portion 206a of the gear portion 205 of the bent gear 204 may come into the recess 96a of the elevator lever 96.

When the pinion gear 207 stops to fix the selector cover 91 at a predetermined position in the vertical groove 92, this fixing is detected so that the pinion gear 201a of the tray moving mechanism 201 rotates. This rotation is transmitted through the third projection 86c of the shaft 85 and the projection 83 of the third loading gear 80c, as meshing each other, to the third loading gear 80c. This third loading gear 80c drives the rack gear 57 of the third sub-tray 55c, as meshing therewith, to move the third sub-tray 55c backward.

The back end portion A of the third sub-tray 55c proceeds backward while abutting against and sliding on the top face 103a of the first plate 103 of the swing base 100. At this time, the third sub-tray 55c pushes the first plate 103 of the swing base 100 downward so that the swing base 100 turns on the L-shaped hooks 45 and 45' of the chassis 1 to bring its rear end portion downward.

As the third sub-tray 55c proceeds further backward in the sub-tray accommodating portion 68c of the sub-tray pull-in block 65, the projection 71a of the sub-tray fixing stopper 71 comes up into engagement with the lock hole 58a of the third sub-tray 55c.

Figure 22:
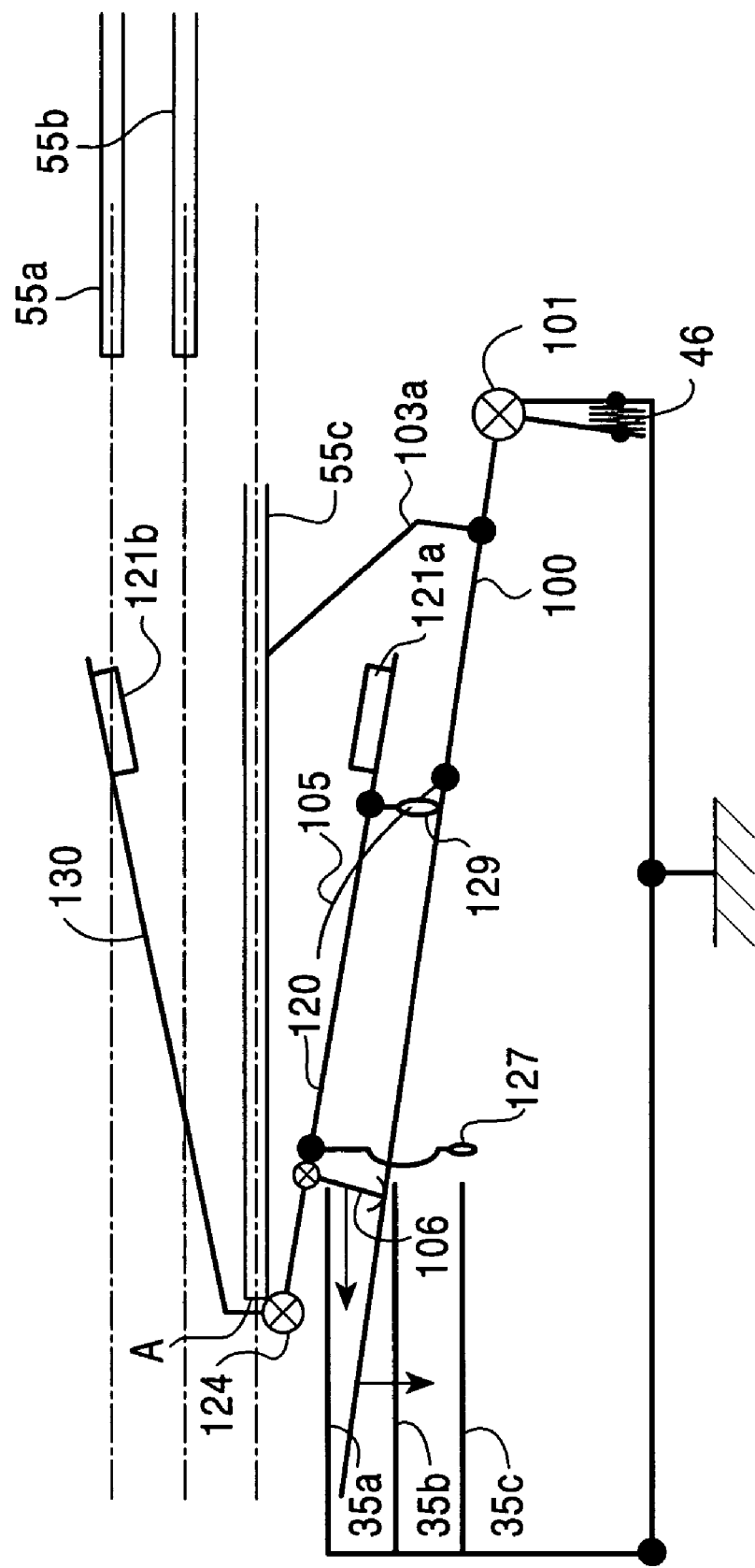
FIG. 22 is a conceptional diagram of an essential portion of the disk transfer mechanism in the state where the third sub-tray is being transferred to the disk playing mechanism.

As the third sub-tray 55c proceeds backward together with the sub-tray pull-in block 65, the end portion A of the depending portion 132 of the clamper holder 130 is positioned in the notch 58c at the back end portion of the third sub-tray 55c (as shown in FIG. 22).

As the third sub-tray 55c proceeds further backward, the projection 69c of the sub-tray pull-in block 65 and the lever 77 of the pull-in plate 75 abut against and engage with each other, as in the aforementioned cases of the first sub-tray 55a and the second sub-tray 55b, so that the pull-in plate 75 is pushed backward. At this time, the turning angle of the swing base 100 is larger than that of the aforementioned case of the second sub-tray 55b so that the height adjusting projections 127 and 127' of the float base 120 are pulled backward in those 35c and 35c' of the horizontal cams formed on the side wall of the accommodating room 2, which are located at the lowermost positions. On the other hand, the cam 129a of the holding plate 129 is pulled in backward while sliding on the bent cam 33c of the chassis 1.

Figure 23:
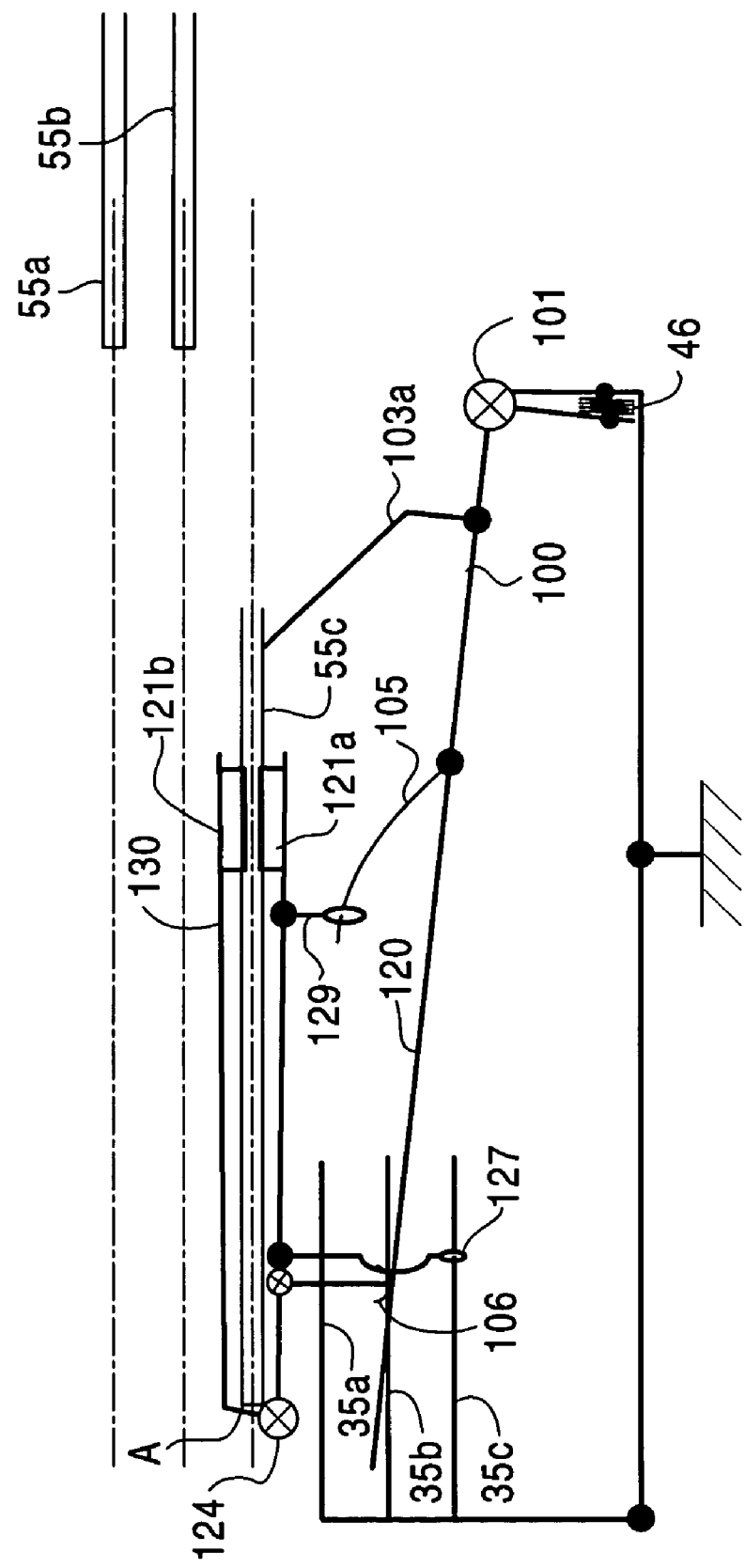
FIG. 23 is a conceptional diagram of the disk transfer mechanism in the state where the third sub-tray has been transferred to the disk playing mechanism.

By the backward movement of the third sub-tray 55c, the pull-in plate 75 is moved to clamp the disk (as shown in FIG. 23). This clamping is similar to that of the aforementioned case of the first sub-tray 55a so that its description will be omitted.

According to the disk player of the invention, as has been described hereinbefore, the positioning of the playing mechanism at the disk playing position and the clamping of the disk are performed with the movement of the sub-tray but not by using any special drive means, so that the number of parts can be reduced to make the player body in a small size.

What is claimed is:

1. A disk player for holding a plurality of disks at a disk standby area in a casing, so that a disk selected from said plurality of disks may be transferred to a disk playing area in said casing and may be reproduced, comprising:
    a plurality of disk trays, which are stacked in a predetermined direction, respectively keeping one of said plurality of disks thereon;
    a disk playing assembly for clamping and playing one of said plurality of disks having been moved to said disk playing area to reproduce information recorded on said disk; and
    a supporting mechanism for supporting said disk playing assembly thereon,
    wherein during a movement in which one of said disk trays is being moved from said disk standby area to said disk playing area said one of disk trays comes into engagement with said supporting mechanism so that said disk playing assembly is caused to move in said predetermined direction thereto, and clamp and play said one of plurality of disks
    wherein said supporting mechanism is rotatably supported about a rocking fulcrum, said disk playing assembly is supported apart from said rocking fulcrum on said supporting mechanism, and said disk playing assembly is moved in said predetermined direction by rotating said supporting mechanism about said rocking fulcrum.

2. A disk player according to claim 1, further comprising:
    elastic means arranged adjacent said rocking fulcrum for generating a biasing force in a direction from said disk standby area to said disk playing area,
    wherein said supporting mechanism is urged around said rocking fulcrum by said elastic means.

3. A disk player according to claim 2, wherein said elastic means is a coil spring.

* * * * *